United States Patent [19]
Miyanaga et al.

[11] Patent Number: 5,879,589
[45] Date of Patent: Mar. 9, 1999

[54] PROCESS FOR ANTISTATIC TREATMENT OF RESIN AND ANTISTATIC RESIN COMPOSITION

[75] Inventors: Seiichi Miyanaga; Yasuhiro Doi; Kenichi Nishimura; Isao Nishi; Yuzo Sumida, all of Wakayama, Japan

[73] Assignee: Kao Corporation, Tokyo, Japan

[21] Appl. No.: 792,131

[22] Filed: Jan. 31, 1997

[30]  Foreign Application Priority Data

| Jan. 31, 1996 | [JP] | Japan | 8-037323 |
| Mar. 21, 1996 | [JP] | Japan | 8-093579 |
| Aug. 28, 1996 | [JP] | Japan | 8-245524 |

[51] Int. Cl.$^6$ .............. H01B 1/20; H01B 1/06; C08K 3/34
[52] U.S. Cl. .............. 252/500; 556/400; 556/430; 524/262
[58] Field of Search .............. 252/500, 519.2, 252/519.21, 521.3; 556/400, 410, 430; 524/262

[56]    References Cited

U.S. PATENT DOCUMENTS

| 4,434,075 | 2/1984 | Mardis et al. | 252/315.2 |
| 4,546,126 | 10/1985 | Breitenfellner et al. | 523/216 |
| 4,550,032 | 10/1985 | Compen et al. | 427/64 |
| 5,354,939 | 10/1994 | Hollstein et al. | 523/206 |

FOREIGN PATENT DOCUMENTS

| 0132228 | 1/1985 | European Pat. Off. . |
| 05405467 | 5/1993 | European Pat. Off. . |
| 3113392A1 | 12/1982 | Germany . |
| 61-213231 | 9/1986 | Japan . |
| 08012881 A2 | 1/1996 | Japan . |

OTHER PUBLICATIONS

Choy et al "New organo–montmorilonite Complexes . . . " *Mater. Lett.*, 33(3,4) 1997(No month) pp. 143–147 (Abstract only), 1997.

Ogawa et al. "Preparation of Inorganic–Organic Nanocomposites . . . " *Full. Chem. Soc. Jpn.*, 70(11) 1997 (No month) pp. 2593–2618 (Abstract Only), 1997.

Patent Abstracts of Japan, vol. 012, No. 139 (C–491), 27 Apr. 1988 (JP 62 256724 A).

*Primary Examiner*—Mark Kopec
*Attorney, Agent, or Firm*—Birch, Stewart, Kolasch & Birch, LLP

[57] ABSTRACT

The present invention provides a process for the antistatic treatment of a resin which comprises dispersing the following organically-modified layer silicate in a synthetic resin in the state that the following specific state is attained. A novel resin composition is provided, comprising an organically-modified layer silicate compound having a specific volume resistivity of not more than $1 \times 10^{13}$ Ω·cm dispersed in a synthetic resin in a proportion of from 2 to 30 parts by weight based on 100 parts by weight of said synthetic resin in the state that (1) a primary aggregate and/or a secondary aggregate having a short axis length of not more than 500 nm is formed and (2) the average minimum interparticle distance is not more than 500 nm.

21 Claims, 7 Drawing Sheets

PROCESS FOR ANTISTATIC TREATMENT OF RESIN AND ANTISTATIC RESIN COMPOSITION

FIELD OF THE INVENTION

The present invention relates to a permanent antistatic resin composition. More particularly, the present invention relates to a process for reducing the specific volume resistivity of a resin composition to semi-permanently maintain the antistatic properties thereof even under low temperature and humidity conditions, a resin composition which exhibits excellent permanent antistatic properties even under low temperature and humidity conditions and a novel organic modified layer silicate compound to be incorporated therein.

BACKGROUND OF THE INVENTION

Because of its light weight and good workability, a synthetic high molecular material finds wide application. In general, the synthetic high molecular material has a specific volume resistivity as high as $10^{15}$ to $10^{17}$ $\Omega \cdot cm$ and thus can easily be statically electrified. Thus, the synthetic high molecular material causes serious troubles. For example, various electrostatic troubles occur. Further, the molded product of the synthetic high molecular material attracts dust on the surface thereof, marring the appearance thereof. Therefore, in an attempt to provide these synthetic high molecular materials with antistatic properties, various methods have heretofore been tried. The method for providing a resin with antistatic properties can be roughly divided into the following three groups:

(1) A method which comprises applying a surface active agent to the surface of a resin so that the hydrophilic group in the surface active agent adsorbs water in the atmosphere to form a low resistivity electrically-conductive layer on the surface of the molded resin product;

(2) A method which comprises mixing a low molecular surface active agent in a resin so that the surface active agent bleeds out to the surface of the molded resin product during or after molding, allowing the hydrophilic group in the surface active agent to adsorb water in the atmosphere and hence forming a low resistivity electrically-conductive layer on the surface of the molded resin product; and (3) A method which comprises alloying the desired resin with an ionically-conductive polymer so that a thin electrically-conductive polymer phase layer is formed in the vicinity of the surface layer during molding, allowing the polymer phase layer to adsorb water in the atmosphere and hence forming an electrically-conductive layer.

Most common among the foregoing three methods is method (2). This method can work with the addition of an antistatic agent in an amount as small as 0.05 to 2% by weight. This method also can apply to molded products having various shapes. Further, this method essentially involves the use of a low molecular compound which can migrate through a resin. Therefore, the active agent which has bled out to the surface of the molded product can easily be removed when the surface of the molded product is cleaned or wiped out. As a result, the antistatic properties of the molded resin product are lost and take a long time to restore. In this sense, the foregoing antistatic agent is referred to as the same "nonpermanent antistatic agent" as that in method (1). Molded products having a great specific surface area such as sheet and film require a drastically increased amount of an antistatic agent. Therefore, this method can be mainly applied to resins having a glass transition point of not higher than room temperature.

In other words, this method can mainly apply to polypropylene and polyethylene and partly to soft polyvinyl chloride, etc. but can exert only an extremely low effect with resins having a high glass transition temperature such as polystyrene, ABS resin, poly(methyl methacrylate), soft polyvinyl chloride and polycarbonate.

Method (3) has been developed as a process for the antistatic treatment of these high glass transition resins. This method can exert a sufficient antistatic effect only when an expensive ionically-conductive polymer is used in an amount of from 20 to 30 vol-% on the basis of percolation theory.

As mentioned above, any of methods (1) to (3) involves ionic conduction by adsorbed or intercalated water as an essential electrical conduction mechanism. Thus, these methods have a common disadvantage in that the antistatic effect thus developed is drastically impaired under dried conditions or in the winter season.

On the other hand, in an attempt to modify a resin, the dispersion of an organically-modified layer silicate in which an organic compound is intercalated has been tried. A layer silicate is a typical layer inorganic compound constituting clay. For example, a 2:1 type lamellar silicate mineral comprises two sheets of silica tetrahedral silicate having an octahedral sheet containing magnesium or aluminum sandwiched therebetween. These three sheets constitutes one indivisible silicate layer (thickness: 1.0 nm). Several to scores of sheets of these silicate layers are laminated in parallel to form a primary aggregate. In general, these primary aggregates of layer silicate are further aggregated randomly to form a secondary aggregate having a particle diameter of hundreds of nanometers to several micrometers. Smectite, vermiculite, talc and mica are typical layer silicate compounds having such a structure. Among these layer silicate compounds, smectite and synthetic mica have a proper interlayer charge density and hence exhibit good water swelling characteristics. It is thus said that when immersed in water, these layer silicate compounds can dissociate its secondary aggregate structure and can thus be uniformly dispersed. Some kinds of layer silicate compounds can even dissociate the rigid primary aggregate structure and can thus be dispersed in the form of single layer ("Handbook of Clay", 2nd ed., Japan Society of Clay). These lamellar silicate compounds have an ion exchange capacity. When brought into contact with various cationic compounds, a composite material comprising smectite or synthetic mica having these cationic compounds intercalated therein rather than metallic ions which have heretofore been used. In this case, if an organic ammonium salt as an organic cation is used, a lipophilic (hydrophobic) organically-modified layer silicate can be obtained (The term "organically-modified" as used in this case is meant to indicate the state of modification involving the exchange of ions between layers rather than mere surface modification or surface treatment of aggregate with a coupling agent or active agent). These organically-modified layer silicates occur in the form of secondary aggregate similar to the foregoing unmodified layer silicate. In other words, these organically-modified layer silicates have an increased spacing (including the thickness of one silicate layer) of from several nanometer to 7.0 nm depending on the structure of organic ammonium intercalated between layers. However, these organically-modified layer silicates essentially comprise a regular layer primary aggregate structure which is randomly aggregated to form a secondary aggregate. A smectite clay mineral which has been organically modified, particularly with dodecylammonium, octadecylammonium, trimethyloctadecylammonium, dimethyldioctadecylammonium, benzyldimethyloctadecylammonium, etc., has been marketed in the name of organic bentonite and long been used as coating thickener. These known organically-modified layer silicates have been available in the form of compound modified with a single or double long-chain (other substituents on nitrogen atom include hydrogen atom, methyl group and benzyl group) alkylammonium having 18 or less carbon atoms for the convenience of synthesis of ammonium salt. These organically-modified layer silicates are soluble in some aromatic solvents such as toluene and benzene but have a low affinity for polar solvents such as alcohol and acetone and thus are insoluble in aliphatic hydrocarbon solvents such as hexane and pentane.

Various attempts have been made to disperse these organically-modified layer silicates in a resin. However, these organically-modified layer silicates can be dispersed in a resin more hardly than in organic solvents due to its dependence of solubility parameter on molecular weight. In general, even a secondary aggregate cannot be dissociated. Such a poor resin dispersion system cannot exert an antistatic effect as described in Comparative Example 3 in JP-A-61-213231 (The term "JP-A" as used herein means an "unexamined published Japanese patent application"). In particular, a thermoplastic resin having a low polarity such as polyolefin thermoplastic resin and polystyrene thermoplastic resin can even more hardly be uniformly dispersed in an organically-modified clay.

A single long-chain organically-modified layer silicate such as dodecyltrimethyl ammonium-modified clay and trimethyl octadecyl ammonium-modified clay has a low affinity for organic materials and thus is unevenly present almost as it is in the form of secondary aggregate having a size of several micrometer to scores of micrometer in a resin such as polystyrene and polypropylene. Such a huge secondary aggregate of lamellar silicate in a resin can easily be visually recognized. Even a microscopically transparent resin looks cloudy. When analyzed by electron microscope or like means, such a resin dispersion can be confirmed to have no silicate layers dispersed in the resin matrix (FIG. I-1). The double long-chain dimethyldioctadecyl ammonium-modified clay, which has been most widely spread, provides some improvement in the compatibility with resins. However, the double long-chain dimethyldioctadecyl ammonium-modified clay leaves something to be desired. For example, a product obtained by melt-kneading the modified clay with a polypropylene resin by means of a roll kneader for 10 minutes has huge secondary aggregates having a thickness of not less than 1 $\mu$m left therein ("Transactions of 4th Forum of Polymer Materials", page 294, 1995). It is known that when the modified clay is mixed in a solvent in a higher mixing efficiency, only an organic clay-resin composition having a drastically reduced transparency [in other words, the content of aggregates having a short axis length of not less than about wavelength of visible light (=1 $\mu$m) is very high] can be obtained ("Transactions of 38th Forum of Clay Science", page 52, 1994).

Such a poor dispersion system cannot exert an antistatic effect as described in Comparative Example 3 in JP-A-61-213231.

The above cited JP-A-61-213231 proposes a technique which comprises adding an organically-modified clay to a resin composition containing an organic antistatic agent to inhibit the bleeding of the organic antistatic agent and hence provide a prolonged stability of antistatic properties. As a system which shows no resistivity drop there is disclosed in Comparative Example 8 in the above cited patent a composition system made of trimethyloctadecyl ammonium-modified clay and a polyvinyl chloride (containing a large amount of a plasticizer) having a spcific volume resistivity of $7 \times 10^{11}$ $\Omega \cdot$cm. In the comparative example, an organically-modified clay is used in an amount as large as 40 parts by weight based on 100 parts by weight of the resin used. It is obvious that such an ordinary composition system exceeding the threshold value of percolation shows some resistivity drop. Thus, such a composition system has neither technical significance nor industrial usefulness. Further, such a composition system essentially differs from the target aimed by the inventors.

JP-A-58-67338 discloses a gel-forming agent comprising an organic cation-organic anion complex intercalated in a smectite type clay. It is proposed that the gel-forming agent may comprise a branched chain incorporated therein as an organic cation which is one component of the complex. However, the gel-forming agent is quite different in structure from the organically-modified layer silicate comprising only a quaternary ammonium cation having a specific branched chain intercalated therein as defined herein. Further, this patent discloses no examples of gel-forming agent having a branched chain. Moreover, no reference is made to the fact that the gel-forming agent described in this patent can be dispersed in a nonpolar solvent such as liquid paraffin. There is no suggestions to the fact that thermoplastic resins can be provided with permanent antistatic properties.

The inventors have made extensive studies of the foregoing problems. As a result, a process for the permanent antistatic treatment of a resin based on quite a new mechanism has been found. In other words, it has been found that a resin comprising a properly organically-modified lamellar silicate compound having a specific volume resistivity as extremely low as from $10^8$ to $10^{12}$ $\Omega \cdot$cm due to electronic conduction uniformly dispersed therein exhibits permanent antistatic properties. In some detail, an organically-modified layer silicate compound having a specific volume resistivity of not more than $1 \times 10^{13}$ $\Omega \cdot$cm is dispersed in a synthetic resin in such an arrangement that a primary aggregate and/or a secondary aggregate having a short axis length of not more than 500 nm is formed and the average minimum interparticle distance is not more than 500 nm. In accordance with the present process, various resins can be provided with permanent antistatic properties which cannot be impaired even when the surface of the molded product of the resins is wiped. This process can apply to non-polar polymers such as polyolefin resin. The antistatic properties appear immediately after molding. The antistatic properties don't need to be mediated by adsorbed water and thus can work even under low temperature and low humidity conditions. The present process also makes it possible to uniformly reduce the specific volume resistivity of the entire resin and thus is also effective for both thick and film-like products and film-like molded products having a great specific surface area. Thus, any special molding conditions under which the antistatic properties can work are not required. The present process can apply to a system having a filler or a third component incorporated therein without any problem. The present process can further apply to a system in which a highly-concentrated master batch is diluted before use without any problem. Further, the present process neither deteriorates the physical properties of the resin nor impairs the color tone of the resin. The present process can maintain the transparency of the resin, if it is transparent. It should be noted that the permanent antistatic treatment technique disclosed herein makes it possible to reduce the lowest necessary added amount of the organically-modified layer silicate compound as an electrically conductive carrier to a value as extremely small as 2 to 3 vol-%. Further, the permanent antistatic resin composition prepared according to the process of the present invention exerts secondary effects. In other words, the permanent antistatic resin composition of the present invention exhibits excellent weather resistance, heat resistance, dimensional stability, corrosion resistance, abrasion resistance, fire retardance and gas barrier properties.

The inventors further found that the novel organically-modified layer silicate which can be preferably used in the foregoing process can also exert an excellent effect as a thickening agent for non-polar solvent. Thus, the present invention has been worked out.

SUMMARY OF THE INVENTION

It is therefore an object of the present invention to provide a resin composition obtained by dispersing an organically-modified layer silicate in a synthetic resin in such an arrangement that the foregoing specific state is attained.

It is another object of the present invention to provide an organically-modified layer silicate comprising a quaternary ammonium ion intercalated in a swellable layer silicate.

It is a further object of the present invention to provide a process for the antistatic treatment of a resin which comprises dispersing the foregoing organically-modified layer silicate in a synthetic resin in such an arrangement that the foregoing specific state is attained.

These and other objects of the present invention will become more apparent from the following detailed description and examples.

BRIEF DESCRIPTION OF THE DRAWINGS

By way of example and to make the description more clear, reference is made to the accompanying drawings in which.

DETAILED DESCRIPTION OF THE INVENTION

Figure 1A:
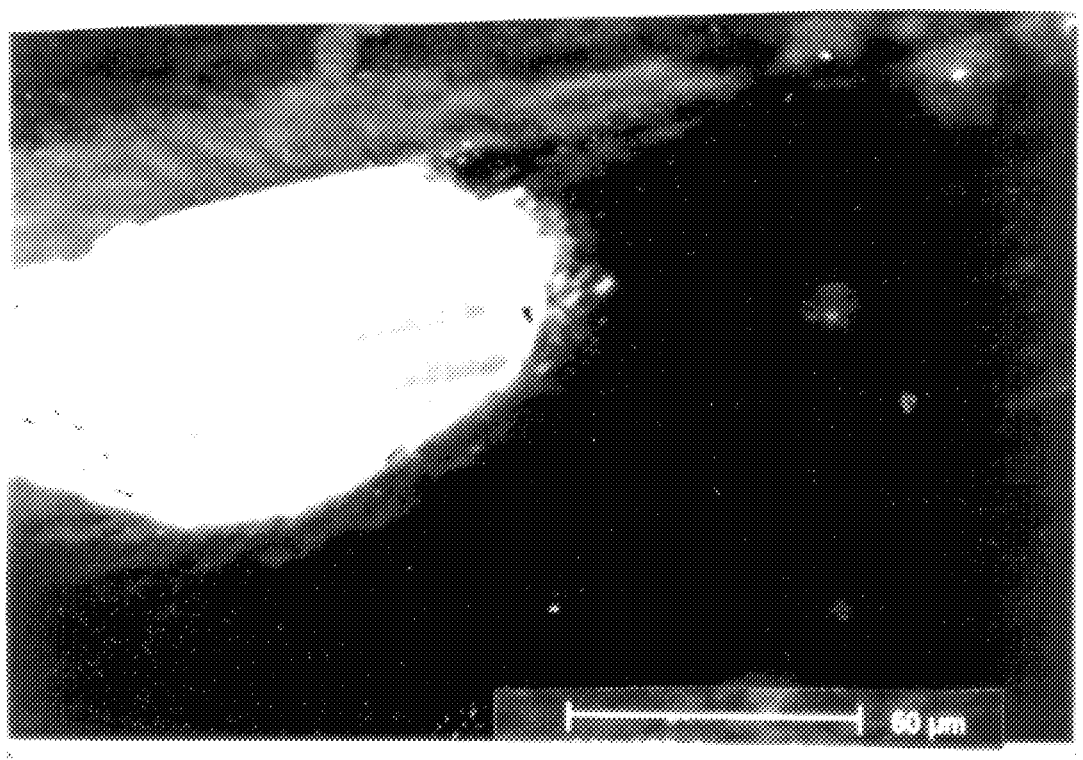
FIG. 1A is an electron micrograph illustrating the particle structure of a commercial trimethyloctadecyl ammonium-modified clay-polypropylene resin composition.
Figure 1B:
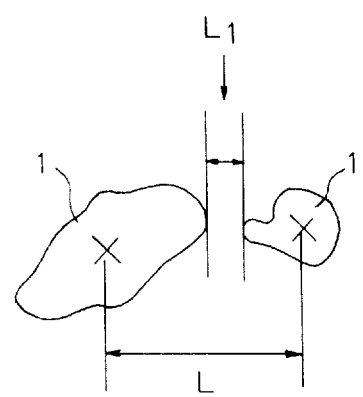
FIG. 1B is a model view illustrating the average minimum interparticle distance according to the present invention.
Figure 2A:
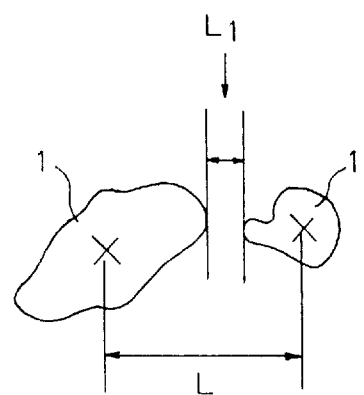
FIG. 2A is a model view illustrating the average minimum interparticle distance according to the present invention.

The technical point of the present invention is to finely disperse an organically-modified layer silicate compound having a specific volume resistivity of not more than about $1 \times 10^{13}$ $\Omega \cdot cm$ in the state that the average minimum interparticle distance reaches not more than 500 nm. The term "particle" as used herein is meant to indicate the maximum individual unit of a continuous organically-modified clay phase which exists independently in the resin. In a phase forming secondary aggregate, the particle indicates secondary aggregate rather than primary aggregate unit. The term "interparticle distance" as used herein is meant to indicate the distance $L_1$ between the outer edge of particles 1 rather than the distance L between the center of gravity of particles 1 in FIGS. 1B and 2A.

An unmodified layer silicate is normally an insulating material having a specific volume resistivity of not less than $10^{14}$ $\Omega \cdot cm$ when bone-dried. The inventors found that a properly organically-modified layer silicate compound has a specific volume resistivity as extremely low as from $1 \times 10^8$ to $1 \times 10^{13}$ $\Omega \cdot cm$ due to electronic conduction. The inventors further found that while the maximum allowable distance between two isolated substances (particle/molecule/ion) across which electric current can flow (transfer of electric charge) under the application of 100 volt at maximum is not more than about 10.0 nm, a sufficient electric current can flow across even two substances which are isolated at a distance as far as 500 nm under the same conditions in the art of antistatic treatment of a resin in which the passage of an electric current as extremely small as $10^{-9}$ to $10^{-11}$ A suffices. In other words, when the matrix is filled with a substance having a specific volume resistivity of not more than $1 \times 10^{13}$ $\Omega \cdot cm$ with the average minimum interparticle distance being kept to not more than 500 nm, the specific volume resistivity of the entire system can be lowered with the addition of such a substance in an extremely small amount. Thus, it is not necessary that the particles of such a substance exist in contact with each other or apart from each other at a distance of not more than 10.0 nm. It is known that the minimum required volume fraction (threshold value of percolation) of the low resistivity substance can vary with various conditions such as shape (anisotropy), size and degree of dispersion of the low resistivity substance. The inventors found that the use of a particle material rich in anisotropy of shape [(scores of nanometer to scores of micrometer)×(scores of nanometer to scores of micrometer) ×(several nanometer to scores of nanometer) in the case of primary aggregate] such as organically-modified layer silicate makes it possible to lower the minimum required volume fraction to a value of from about 2 to 3 vol-%. This is the smallest threshold value of percolation which has ever been known.

However, any resin composition which realizes the foregoing concept has never been basically known. In short, any inorganic compound which can be uniformly dispersed in a resin on such a scale has never been known. (Glass fiber, carbon fiber, carbon black, mica, particulate metal, etc. are far greater than the foregoing scale themselves. On the other hand, the structural unit of a compound such as calcium carbonate and aluminum oxide is fine. However, since the aggregate of such a compound is disintegrated, it has never been dispersed on the foregoing scale.) Referring to organic compounds, a low molecular compound which is relatively compatible with a resin easily bleeds and can be unevenly distributed. Thus, a compound having a low compatibility undergoes phase separation as a huge particle rather than dispersion. Further, a high molecular compound is normally difficultly-compatible with a resin and has a phase separation structure as huge as several micrometers. Accordingly, the tendency for harder dispersion of additives is remarkable with hydrocarbon resins such as polystyrene and polyolefin resins having a low polarity, particularly aliphatic hydrocarbon resins such as polypropylene and polyethylene resins. It goes without saying that no matter how poor the dispersibility given by the system is, if the low resistivity organically-modified layer silicate is added in an amount such that the low resistivity dispersed material (particle) comes in contact with each other (from 40 to 70 vol-%), the specific volume resistivity of the entire system of resin composition can be lowered. However, such a system has no practical significance.

In the present invention, an organically-modified layer silicate having a specific volume resistivity of not more than $1 \times 10^{13}$ Ω·cm is dispersed in a resin in the state that (1) a primary aggregate and/or a secondary aggregate having a short axis length of not more than 500 nm is formed and (2) the average minimum interparticle distance is not more than 500 nm.

The number of laminae of primary aggregate is preferably from several to scores on the average. The less the number of laminae of primary aggregate is, the greater is the volume resistivity thereof. However, if the number of laminae of primary aggregate is too great (even if the amount of the silicate compound used is the same), the volume resistivity thereof is raised. The short axis length of secondary aggregate is not more than 500 nm, preferably not more than 200 nm, more preferably not more than 100 nm. The use of an organically-modified layer silicate compound having a short axis length of not more than 500 nm in the form of secondary aggregate makes it possible to obtain a good transparency and a high impact strength. The use of such an organically-modified layer silicate compound also makes it possible to increase the number of particles which can exist in the system. Thus, the provability of appearance of antistatic properties can be raised even when the organically-modified layer silicate compound is used in the same amount. The ratio of primary aggregate to secondary aggregate having a short axis length of not more than 500 nm is preferably high. If the ratio of secondary aggregate is too high, the number of particles which can exist in the system is decreased, lowering the probability of appearance of antistatic properties even if the organically-modified layer silicate compound is used in the same amount.

Referring to the determination of the dispersibility of an organically-modified layer silicate compound in a resin, the description of the state of dispersion is extremely difficult. No satisfactory representation has been found yet. Referring to the dispersion of spherical particles, the average number of particles contained per unit volume is described with average particle diameter for convenience. However, this representation is not sufficient for the description of the resin dispersion of an organically-modified layer silicate compound which causes the appearance of antistatic properties based on a new electrical conduction mechanism, which is one of the objects of the present invention. Further, the organically-modified layer silicate compound to be used in the present invention normally comprises a constituent unit as extremely fine as hundreds of nanometers×hundreds of nanometers×1 nm. For the judgement of the state of dispersion of the organically-modified layer silicate compound, a high resolution transmission type electron micrograph is indispensable, making it difficult to solve the foregoing problems. The inventors made extensive comparative studies of an extremely large number of antistatic organically-modified layer silicate compound-resin composites and organically-modified layer silicate compound-resin composites which exhibit no antistatic properties. As a result, it was found that, except for special exceptional systems, when an organically-modified layer silicate compound having a specific volume resistivity of not more than $1 \times 10^{13}$ Ω·cm undergoes disintegration of secondary aggregate and then undergoes dispersion in the form of primary aggregate and/or secondary aggregate having a minimum diameter of not more than 500 nm at maximum in such an arrangement that the matrix is completely filled with the organically-modified layer silicate with the distance between adjacent particles being kept to not more than about 500 nm, the specific volume resistivity of the entire resin composition is lowered, allowing desired antistatic properties to appear. When the organically-modified layer silicate compound, even if added in a small amount, is uniformly dispersed in the resin with the minimum interparticle distance being kept to not more than about 500 nm, a sufficient electrically-conductive passage is seemingly secured to enable the transfer of electric charge on a sufficient level for the purpose of antistatic treatment of resin. It goes without saying that when the volume fraction of the organically-modified layer silicate compound as a low resistivity electrically-conductive carrier in the resin composition is not less than 70 to 80 vol-% no matter how poor the dispersion is, or not less than 20 to 30 vol-% (about 30 wt-% to 40 wt-%) if an ordinary degree of dispersion is attained, the specific volume resistivity of the entire resin composition can be lowered. The present invention proposes that when the dispersion defined in the foregoing conditions (1) and (2) is attained, the specific volume resistivity of the entire resin composition can be lowered even if the organically-modified layer silicate compound is added in an amount of from 2 to 15 vol-% (corresponding to from about 3.3 wt-% to 23 wt-%). In order to efficiently provide a resin with permanent antistatic properties, it is desirable that there are no huge secondary aggregates having a short axis length of not less than 500 nm. However, if the organically-modified layer silicate compound can attain the foregoing dispersion in a proportion of from 2 to 30 parts by weight based on 100 parts by weight of the resin used, the system may contain undisintegrated mass secondary aggregates, other fillers, etc. In such a system, the substantial volume fraction of the organically-modified layer silicate in the resin matrix may fall within the above defined range. Thus, the lower limit of the amount of the organically-modified layer silicate required for the appearance of the desired antistatic properties may be apparently far less.

The specific volume resistivity of the organically-modified layer silicate to be used in the present invention is not more than $1 \times 10^{13}$ Ω·cm, preferably not more than $1 \times 10^{11}$ Ω·cm, more preferably not more than $1 \times 10^{10}$ Ω·cm. The lower the specific volume resistivity of the organically-modified layer silicate is, the more easily can be attained the desired low resistivity and the less is the required amount of the organically-modified layer silicate. If the specific volume resistivity of the organically-modified layer silicate exceeds $1 \times 10^{13}$ Ω·cm, good antistatic properties cannot be obtained even when the organically-modified layer silicate is used in an amount of 30 parts by weight.

Examples of the resin to which the present invention can be applied include thermosetting resin, thermoplastic resin, and heat decomposable resin. The thermosetting resin gives a non-fusible and insoluble resin when polymerized. Therefore, the organically-modified layer silicate must be added to a prepolymer or monomer before the completion of polymerization. Examples of the thermosetting resin employable herein include phenolic resin, urea resin, melamine resin, and epoxy resin. Examples of the thermoplastic resin employable herein include thermoplastic polyolefin resin such as polypropylene resin, polypropylene unit-containing resin, polyethylene resin, polyethylene unit-containing resin, polybutadiene and polyisobytylene; styrene unit-containing thermoplastic resin such as polystyrene resin and styrene-butadiene copolymer resin; thermoplastic nitrile group-containing resin such as polyacrylonitrile and acrylonitrile-butadiene-styrene (ABS) resin; thermoplastic ester group-containing resin such as polyethylene terephthalate (PET) and poly(meth)acrylic ester resin; polyamide resin such as polyvinyl chloride, polyvinylidene chloride, fluororesin, silicone resin and nylon; and thermoplastic resin such as polyurethane resin, polycarbonate resin and polyimide resin. Further examples of the thermoplastic resin include super-engineering plastics such as polyphenylene sulfide (PPS) and polyether sulfone (PES). Particularly preferred among these resins are thermoplastic resins such as polyolefin and polystyrene.

In the present invention, the amount of the organically-modified layer silicate to be incorporated in the state of dispersion meeting the foregoing requirements (1) and (2) is from 2 to 30 parts by weight based on 100 parts by weight of the synthetic resin used. In the resin composition in the form of final product, the amount of the organically-modified layer silicate is from 2 to 20 parts by weight, preferably from 3 to 15 parts by weight, more preferably from 5 to 10 parts by weight. When the added amount of the organically-modified layer silicate falls within the above defined range, a high probability of appearance of good antistatic properties can be obtained. The resulting resin exhibits good antistatic properties. The amount of the organically-modified layer silicate to be incorporated in a master resin composition to be diluted before use is from 5 to 30 parts by weight, preferably from 10 to 30 parts by weight based on 100 parts by weight of the synthetic resin used. The organically-modified layer silicate compound in the state of dispersion deviating from the requirements (1) and (2) may be incorporated in the resin system in any fraction or may not be incorporated in the resin system. Further, a filler such as calcium carbonate and clay, a reinforcing material such as glass fiber and carbon fiber, and a resin additive such as an oxidation inhibitor, UV stabilizer, lubricant, weatherproofing agent, nucleating agent, pigment, dye and mildewproofing agent may be additionally incorporated in the resin system in any fraction so far as the permanent antistatic properties attained by the present invention are not impaired or may not be incorporated in the resin system.

The preparation of the organically-modified layer silicate compound-resin composition of the present invention having permanent antistatic properties can be accomplished by any of a process which comprises the melt-kneading of an organically-modified layer silicate compound with a thermoplastic resin, a process which comprises the polymerization/resinification of a monomer or prepolymer having an organically-modified layer silicate uniformly dispersed therein and a process which comprises the mixing/solvent distillation of an organically-modified layer silicate compound and a resin in a solvent. The foregoing resin and organically-modified layer silicate compound can be efficiently kneaded at a high shear by means of a twin-roll kneader or the like.

The organically-modified layer silicate compound to be used in the present invention is preferably a reaction product of a layer silicate having a cation exchange capacity of not less than 50 meq/100 g with an organic ammonium salt having 26 carbon atoms or more in total. The amount of the organic ammonium salt to be used based on the layer silicate is not specifically limited so far as the organically-modified layer silicate compound can be dispersed in the resin while meeting the foregoing requirements (1) and (2). In general, the amount of the organic ammonium salt to be used is preferably from 0.5 to 2.0 times the equivalent of cation exchange capacity of the lamellar silicate. Specific examples of the organic ammonium salt employable herein will be given below.

(1) Organic ammonium salt represented by formula (I):

wherein $R^1$ and $R^2$ may be the same or different and each represent an alkyl group having 12 or more carbon atoms which may have substituents; and $X^\ominus$ represents a counter ion.

(2) Organic ammonium salt represented by formula (II):

wherein $R^3$ and $R^4$ may be the same or different and each represent an alkyl group having 12 or more carbon atoms which may have substituents; $R^5$ represents a hydrogen atom or $C_{2-7}$ alkyl or aryl group which may have substituents; $R^6$ represents a hydrogen atom or $C_{1-7}$ alkyl or aryl group which may have substituents; and $X^\ominus$ represents a paired ion.

(3) Organic ammonium salt represented by formula (III):

wherein $R^7$, $R^8$ and $R^9$ may be the same or different and each represent an alkyl group having 8 or more carbon atoms which may have substituents; $R^{10}$ represents a hydrogen atom or alkyl or aryl group having one or more carbon atoms which may have substituents; and $X^\ominus$ represents a counter ion.

(4) Organic ammonium salt represented by formula (IV):

wherein $R^{11}$ represents an alkyl group having 8 or more carbon atoms which may have substituents; $R^{12}$ represents a $C_{1-11}$ alkyl group which may have substituents; $R^{13}$ and $R^{14}$ may be the same or different and each represent a $C_{1-7}$ alkyl group which may have substituents; and $X^\ominus$ represents a counter ion.

(5) Organic ammonium salt represented by formula (V):

wherein $R^{15}$ represents a mono- or polyoxyalkylene group comprising a $C_{2-4}$ oxyalkylene unit; $R^{16}$ and $R^{17}$ may be the same or different and each represent a substituent selected from the group consisting of $C_{1-30}$ alkyl group which may have substituents and mono- or polyoxyalkylene group comprising a $C_{2-4}$ oxyalkylene unit, with the proviso that the addition mole number of oxyalkylene unit is from 1 to 50; $R^{18}$ represents a hydrogen atom or $C_{1-8}$ alkyl or aryl group which may have substituents; and $X^{\ominus}$ represents a counter ion.

(6) Organic ammonium salt represented by formula (VI):

wherein $R^{19}$ represents an alkylmono- or polyoxyalkylene group comprising an alkyl unit having one or more carbon atoms which may have substituents and a $C_{2-4}$ oxyalkylene unit which may have substituents, phenylmono- or polyoxyalkylene group having a $C_{2-4}$ oxyalkylene unit, alkylphenylmono- or polyoxyalkylene group comprising an alkyl unit having one or more carbon atoms which may have substituents and a $C_{2-4}$ oxyalkylene unit, or acylmono- or polyoxyalkylene group comprising an acyl unit having 2 or more carbon atoms which may have substituents and a $C_{2-4}$ oxyalkylene unit; $R^{20}$ and $R^{21}$ may be the same or different and each represent at least one substituent selected from the group consisting of $C_{1-30}$ alkyl group which may have substituents, mono- or polyoxyalkylene group comprising a $C_{2-4}$ oxyalkylene unit, alkylmono- or polyoxyalkylene group comprising an alkyl unit having one or more carbon atoms which may have substituents and a $C_{2-4}$ oxyalkylene unit which may have substituents, phenylmono- or polyoxyalkylene group having a $C_{2-4}$ oxyalkylene unit, alkylphenylmono- or polyoxyalkylene group comprising an alkyl unit having one or more carbon atoms which may have substituents and a $C_{2-4}$ oxyalkylene unit, and acylmono- or polyoxyalkylene group comprising an acyl unit having 2 or more carbon atoms which may have substituents and a $C_{2-4}$ oxyalkylene unit, with the proviso that the addition mole number of oxyalkylene unit is from 1 to 50; $R^{22}$ represents a hydrogen atom or $C_{1-8}$ alkyl or aryl group which may have substituents; and $X^{\ominus}$ represents a counter ion.

(7) Organic ammonium salt represented by formula (VII):

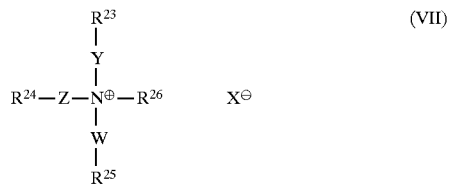

wherein $R^{23}$, $R^{24}$ and $R^{25}$ may be the same or different and each represent at least one substituent selected from the group consisting of $C_{1-30}$ alkyl group which may have substituents, mono- or polyoxyalkylene group comprising a $C_{2-4}$ oxyalkylene unit, alkylmono- or polyoxyalkylene group comprising an alkyl unit having one or more carbon atoms which may have substituents and a $C_{2-4}$ oxyalkylene unit which may have substituents, phenylmono- or polyoxyalkylene group having a $C_{2-4}$ oxyalkylene unit, alkylphenylmono- or polyoxyalkylene group comprising an alkyl unit having one or more carbon atoms which may have substituents and a $C_{2-4}$ oxyalkylene unit, and acylmono- or polyoxyalkylene group comprising an acyl unit having 2 or more carbon atoms which may have substituents and a $C_{2-4}$ oxyalkylene unit; $R^{26}$ represents a hydrogen atom or $C_{1-8}$ alkyl or aryl group which may have substituents, with the proviso that the addition mole number of oxyalkylene unit is from 1 to 50; at least one of Y, Z and W represents at least one connecting group selected from the group consisting of —$CH_2O$—, —$CH_2COO$—, —$CH_2CH_2COO$—, —$CH_2OCO$—, —$CH_2CH_2OCO$—, —$(CH_2)_mNHCO$— and —$(CH_2)_mNHCO$—$CH_2O$— and the others each represent a direct bond to the nitrogen atom in the ammonium group; m represents an integer of from 1 to 4; and $X^{\ominus}$ represents a counter ion.

(8) Organic ammonium salt represented by formula (VIII):

wherein $R^{101}$ represents a branched saturated aliphatic alkyl group having 24 or more carbon atoms and containing a side chain alkyl group having 8 or more carbon atoms; and $X^{\ominus}$ represents a counter ion.

(9) Organic ammonium salt represented by formula (IX):

wherein $R^{102}$ and $R^{103}$ each represent a saturated aliphatic alkyl group having 12 or more carbon atoms, with the proviso that at least one of $R^{102}$ and $R^{103}$ represents a branched saturated aliphatic alkyl group having one or more side chain alkyl groups having one or more carbon atoms; and $X^{\ominus}$ represents a counter ion.

(10) Organic ammonium salt represented by formula (X):

wherein $R^{201}$ represents a branched saturated aliphatic alkyl group having 18 or more carbon atoms containing at least one alkyl group having one or more carbon atoms in its side chain; $R^{202}$, $R^{203}$ and $R^{204}$ may be the same or different and each represent a hydrogen atom or $C_{1-2}$ alkyl group; and $X^{\ominus}$ represents a counter ion.

Examples of the organic ammonium salt represented by the foregoing formula (X) include an organic ammonium salt wherein $R^{201}$ represents a branched saturated aliphatic alkyl group having 24 carbon atoms containing a side-chain alkyl group having 8 or more carbon atoms and $R^{202}$, $R^{203}$ and $R^{204}$ each represent a methyl group.

(11) Organic ammonium salt represented by formula (XI):

wherein $R^{205}$ and $R^{206}$ each represent a saturated aliphatic alkyl group having 8 or more carbon atoms, with the proviso that at least one of $R^{205}$ and $R^{206}$ represents a branched aliphatic alkyl group containing at least one alkyl group having one or more carbon atoms in its side chain; $R^{207}$ and $R^{208}$ may be the same or different and each represents a hydrogen atom or $C_{1-2}$ alkyl group; and $X^{\ominus}$ represents a counter ion.

Examples of the organic ammonium salt represented by the foregoing formula (XI) include an organic ammonium salt wherein $R^{205}$ and $R^{206}$ each represent a saturated aliphatic alkyl group having 12 carbon atoms, with the proviso that at least one of $R^{205}$ and $R^{206}$ is a branched aliphatic alkyl group containing at least one alkyl group having one or more carbon atoms in its side chain, and $R^{207}$ and $R^{208}$ each represent a methyl group.

(12) Organic ammonium salt represented by the following formula (XII):

wherein $R^{209}$, $R^{210}$ and $R^{211}$ each represent a saturated aliphatic alkyl group having 8 or more carbon atoms, with the proviso that at least one of $R^{209}$, $R^{210}$ and $R^{211}$ represents a branched aliphatic alkyl group containing at least one alkyl group having one or more carbon atoms in its side chain; $R^{212}$ each represents a hydrogen atom or $C_{1-2}$ alkyl group; and $X^{\ominus}$ represents a counter ion.

The foregoing organic ammonium salts (I) to (VII) and the specific organic ammonium salts (VIII) to (XII) containing at least one branched alkyl group may be used singly so far as the organically-modified layer silicate compound can be dispersed in a resin (preferably a thermoplastic resin) in the state that the foregoing requirements (1) and (2) are met. Alternatively, two or more of these organic ammonium salts may be used in admixture.

The organically-modified layer silicate to be used in the present invention is a reaction product of the organic ammonium salt represented by one of the foregoing formulae (I) to (XII) with a layer silicate. The inventors found that the uniform dispersion of such an organically-modified layer silicate in a synthetic resin makes it possible to lower the specific volume resistivity thereof. As a result, a permanently antistatic resin composition can be provided. In particular, the organically-modified layer silicate made of an organic ammonium salt having a side-chain branched aliphatic alkyl group represented by one of the foregoing formulae (VIII) to (XII) can be uniformly dispersed in a non-polar solvent such as liquid paraffin in which the conventional organically-modified layer silicates can hardly be uniformly dispersed to exert a thickening effect besides the foregoing permanent antistatic effect. Thus, such an organically-modified layer silicate can be used as a thickening agent for cosmetic cream comprising liquid paraffin.

The organically-modified layer silicate comprising an organic ammonium salt represented by one of the formulae (VIII) to (XII) can be easily obtained by the reaction of an organic ammonium salt having a branched aliphatic alkyl group with a layer silicate. Such an organic ammonium salt can be obtained by a process which comprises reacting a branched alcohol with an amine to synthesize an amine having a branched alkyl group, and then quaterizing the amine with a quaterizing agent such as methyl chloride. However, the present invention is not limited to this process.

Figure 1C:
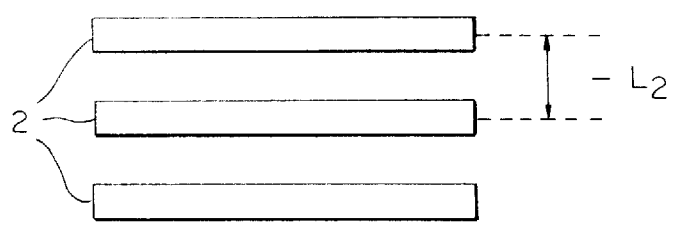
FIG. 1C is a model view illustrating the interplanar spacing according to the present invention.
Figure 2B:
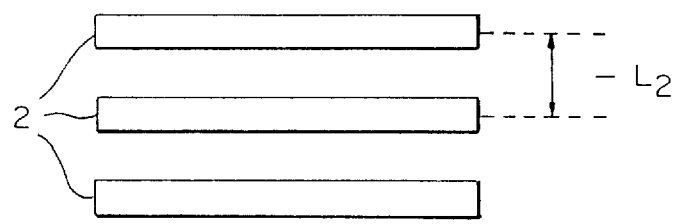
FIG. 2B is a model view illustrating the spacing according to the present invention.

The interplanar spacing in the organically-modified layer silicate compound obtained by the modification with an organic ammonium salt represented by one of the formulae (I) to (IV) is preferably from 2.3 to 5.0 nm, more preferably from 2.5 to 4.0 nm, particularly from 2.5 to 3.5 nm. The spacing in the organically-modified layer silicate compound obtained by the modification with an organic ammonium salt represented by one of the formulae (V) to (VII) is from 2.3 to 7.0 nm, preferably from 2.5 to 4.5 nm. The term "interplanar spacing" as used herein is meant to indicate the distance between layer repeating units which give reflection by X-ray diffractometry from the crystallographic standpoint of view. In the case of a substance having a substantial thickness such as layer silicate, spacing include the thickness of a lamina. In other words, the term "interplanar spacing" as used herein is meant to indicate the distance $L_2$ between layer repeating units 2 in FIGS. 1C and 2B.

In order to disperse an organically-modified layer silicate compound having a specific volume resistivity of not more than $1 \times 10^{13}$ Ω·cm in a resin in such an arrangement that the foregoing requirements are met, it is necessary that the combination of the organically-modified layer silicate compound and the resin be considered. In other words, an organically-modified layer silicate compound obtained by the modification with an organic ammonium salt represented by one of the formulae (I) to (VII) can be used in connection with all kinds of resins. If a low polarity or non-polar resin such as thermoplastic polyethylene resin, thermoplastic polyethylene unit-containing resin, thermoplastic polypropylene resin, thermoplastic polyethylene unit-containing resin, thermoplastic polystyrene resin and thermoplastic styrene unit-containing resin is used, it is preferred that an organically-modified layer silicate compound obtained by the modification with an organic ammonium salt represented by one of the formulae (I) to (IV) be used.

If the resin to be used is relatively rich in polarity, it is preferred that an organically-modified layer silicate compound obtained by the modification with an organic ammonium salt represented by one of the formulae (V) to (VII) be used.

Thus, preferred among the organic ammonium salts (I) to (XII) are those represented by the formulae (I) to (IV) or those represented by the formulae (VIII) to (XII). Particularly preferred among these organic ammonium salts are those represented by the formulae (VIII) to (XII).

By using a compatibilizer, activator or dispersing aid or treating the organically-modified layer silicate compound itself with an activator or coupling agent for the purpose of enhancing the dispersion of the organically-modified layer silicate compound in the resin, the range of the combination of an organically-modified layer silicate compound and a resin which can realize the desired antistatic properties can be widened. Further, the required amount of the organically-modified layer silicate compound can be reduced.

The particle diameter of the organically-modified layer silicate to be used is from 50 nm to 8 μm, preferably from 100 nm to 5 μm, more preferably from 200 nm to 5 μm. The particle diameter of the organically-modified layer silicate is preferably not less than 50 nm from the standpoint of advantage in shape anisotropy. Further, the particle diameter of the organically-modified layer silicate is preferably not more than 8 μm from the standpoint of external appearance such as transparency of resin or physical properties such as impact strength of resin.

The cation exchange capacity of the unmodified layer silicate to be used in the present invention is preferably not less than 50 meq/100 g, more preferably from 70 to 120 meq/100 g.

The organically-modified layer silicate of the present invention can be fairly dissolved in various solvents. In particular, the organically-modified layer silicate can be dissolved in a non-polar solvent such as liquid paraffin in which the conventional organically-modified layer silicate can be little dissolved to give a transparent solution. Thus, the organically-modified layer silicate of the present invention can find wide industrial application.

The resin composite of the present invention comprises an organically-modified layer silicate compound containing an organic ammonium salt or a specific organic ammonium salt having at least one branched alkyl group, dispersed in a thermoplastic resin in such an arrangement that the foregoing requirements (1) and (2) are met. Various organically-modified layer silicates may be used in an arbitrary mixing ratio so far as these requirements are met.

The present invention will be further described in the following examples, but the present invention should not be construed as being limited thereto.

EXAMPLE I

<Preparation of organically-modified layer silicates (Compounds A to K and P to X)>

Organic modifiers and layer silicates shown in Tables 1 to 3 were used to prepare organically-modified layer silicates (Compounds A to K and P to X). In some detail, 15 g of an unmodified layer silicate was dissolved in 1 l of 70° C. ion-exchanged water. To the solution was then added a solution of an organic modifier in an amount of 1.05 times the equivalent of cation exchange capacity of the layer silicate used in 70° C. water or ethanol or mixture of water and ethanol with vigorous stirring at once. The mixture was stirred for 30 minutes, and then allowed to stand. The organically-modified layer silicate compound thus obtained was then collected by filtration. The organically-modified layer silicate compound thus collected was washed with hot water and then with ethanol, and then dried at 0.5 mmHg and 80° C. for 72 hours.

In the present example, the following four kinds of unmodified layer silicates were used.

Kunipia F (available from Kunimine Industry Corp.):
 Ion exchange capacity: 119 meq/100 g (Compound L)
Bengel 23 (available from Hojun Yoko Co., Ltd.)
 Ion exchange capacity: 87 meq/100 g
SWN (available from Coop Chemical Co., Ltd.):
 Ion exchange capacity: 115 meq/100 g
ME-100 (available from Coop Chemical Co., Ltd.):
 Cation exchange capacity: 75 meq/100 g As commercial organically-modified layer silicate compounds there were used the following three kinds of compounds (two formers are modified product with dimethyl-dioctadecylammoniums and the latter is a modified product with polyoxypropylene chain-containing ammonium):

SAN (available from Coop Chemical Co., Ltd.): Compound M
 BENTONE 52 (available from RHEOX INC.): Compound N
 SPN (available from Coop Chemical Co., Ltd.): Compound Y For the measurement of interplanar spacing in the commercial and synthesized organically-modified layer silicate compounds, powder X-ray diffractometry (using RU-200 (CuKα-40 kV), available from Rigaku Denki Corp.) was employed. For the measurement of specific volume resistivity, an organically-modified layer silicate compound which had been thoroughly dried in a vacuum desiccator having phosphorus pentaoxide provided therein was formed into compressed pellets having a diameter of 20 mm and a thickness of 1 mm which were then measured in a dried glove compartment. The measurement of specific volume resistivity was carried out by means of a digital ultrahigh resistance/microammeter R8340A available from Advantest Corp. and an HRS probe available from Dia Instrument Inc. equipped with a shield overcoat of the inventors' own making. The results are set forth in Tables I-1 to I-3.

TABLE I-1

| Compound No. | Organic modifier | Layer silicate | Spacing *(nm) | Specific volume resistivity (Ω · cm) |
|---|---|---|---|---|
| A | $C_{10}H_{21}-N^{\oplus}(-C_{10}H_{21})(-C_{10}H_{21})-C_{10}H_{21}$  $Br^{\ominus}$ | Montmorillonite (Kunipia F) | 2.80 | $1.1 \times 10^9$ |
| B | $C_{10}H_{21}-N^{\oplus}(-C_{10}H_{21})(-C_{10}H_{21})-C_{10}H_{21}$  $Br^{\ominus}$ | Bentonite (Bengel 23) | 2.76 | $8.6 \times 10^8$ |
| C | $C_{10}H_{21}-N^{\oplus}(-C_{10}H_{21})(-C_{10}H_{21})-C_{10}H_{21}$  $Br^{\ominus}$ | Synthetic mica (ME-100) | 2.79 | $5.5 \times 10^8$ |
| D | $C_{18}H_{37}-N^{\oplus}(-CH_3)(-C_{18}H_{37})-C_{18}H_{37}$  $Cl^{\ominus}$ | Montmorillonite (Kunipia F) | 4.11 | $9.4 \times 10^{11}$ |
| E | $C_{18}H_{37}-N^{\oplus}(-CH_3)(-C_{18}H_{37})-C_4H_9$  $Cl^{\ominus}$ | Montmorillonite (Kunipia F) | 2.85 | $7.1 \times 10^{11}$ |
| F | $C_{18}H_{37}-N^{\oplus}(-H)(-C_{18}H_{37})-CH_2Ph$  $Cl^{\ominus}$ (Ph: phenyl group) | Montmorillonite (Kunipia F) | 2.65 | $3.8 \times 10^9$ |
| G | $C_{18}H_{37}-N^{\oplus}(-CH_3)(-C_{18}H_{37})-CH_3$  $Cl^{\ominus}$ | Montmorillonite (Kunipia F) | 2.81 | $4.5 \times 10^{11}$ |
| H | $C_{18}H_{37}-N^{\oplus}(-CH_3)(-CH_3)-CH_3$  $Br^{\ominus}$ | Montmorillonite (Kunipia F) | 2.13 | $8.9 \times 10^{11}$ |

*Spacing means Interplanar spacing

TABLE I-2

| Compound No. | Organic modifier | Layer silicate | Spacing *(nm) | Specific volume resistivity ($\Omega \cdot cm$) |
|---|---|---|---|---|
| I | $C_{10}H_{21}-\overset{\overset{\displaystyle C_{10}H_{21}}{\|}}{\underset{\underset{\displaystyle CH_3}{\|}}{N^{\oplus}}}-CH_3$  $Cl^{\ominus}$ | Montmorillonite (Kunipia F) | 1.98 | $5.6 \times 10^{10}$ |
| J | $C_8H_{17}-\overset{\overset{\displaystyle C_8H_{17}}{\|}}{\underset{\underset{\displaystyle C_8H_{17}}{\|}}{N^{\oplus}}}-CH_3$  $Cl^{\ominus}$ | Montmorillonite (Kunipia F) | 1.83 | $1.1 \times 10^{11}$ |
| K | $C_4H_9-\overset{\overset{\displaystyle C_4H_9}{\|}}{\underset{\underset{\displaystyle C_4H_9}{\|}}{N^{\oplus}}}-C_4H_9$  $Cl^{\ominus}$ | Montmorillonite (Kunipia F) | 1.55 | $1.6 \times 10^{11}$ |
| L | — | Montmorillonite (Kunipia F) | 1.23 | $1.3 \times 10^{9}$ |
| M | — | SAN (Coop Chemical) | 2.18 | $6.5 \times 10^{11}$ |
| N | — | Bentone 52 (Rheox) | 2.72 | $7.1 \times 10^{12}$ |
| O | $C_{10}H_{21}-\overset{\overset{\displaystyle C_{10}H_{21}}{\|}}{\underset{\underset{\displaystyle C_{10}H_{21}}{\|}}{N^{\oplus}}}-C_{10}H_{21}$  $Br^{\ominus}$ | — | — | — |
| P | $CH_3-\overset{\overset{\displaystyle CH_3}{\|}}{\underset{\underset{\displaystyle CH_3}{\|}}{N^{\oplus}}}-[CH_2CH(CH_3)O]_{30}H$  $Cl^{\ominus}$ | Montmorillonite (Kunipia F) | 4.58 | $3.7 \times 10^{9}$ |
| Q | $C_{12}H_{25}-\overset{\overset{\displaystyle CH_3}{\|}}{\underset{\underset{\displaystyle CH_3}{\|}}{N^{\oplus}}}-[CH_2CH(CH_3)O]_{20}H$  $Cl^{\ominus}$ | Montmorillonite (Kunipia F) | 3.87 | $7.6 \times 10^{6}$ |
| R | $CH_3-\overset{\overset{\displaystyle CH_3}{\|}}{\underset{\underset{\displaystyle CH_3}{\|}}{N^{\oplus}}}-[CH_2CH(CH_3)O]_{30}H$  $Cl^{\ominus}$ | Synthetic mica (ME-100) | 4.93 | $4.4 \times 10^{9}$ |

*Spacing means interplanar spacing

TABLE I-3

| Compound No. | Organic modifier | Layer silicate | Spacing *(nm) | Specific volume resistivity ($\Omega \cdot cm$) |
|---|---|---|---|---|
| S | $CH_3-\overset{\overset{\displaystyle [CH_2CH(CH_3)O]_{15}H}{\|}}{\underset{\underset{\displaystyle [CH_2CH(CH_3)O]_{15}H}{\|}}{N^{\oplus}}}-CH_3$  $Cl^{\ominus}$ | Hectorite (SMN) | 4.82 | $44.2 \times 10^{10}$ |
| T | $CH_3-\overset{\overset{\displaystyle [CH_2CH(CH_3)O]_{10}H}{\|}}{\underset{\underset{\displaystyle [CH_2CH(CH_3)O]_{10}H}{\|}}{N^{\oplus}}}-[CH_2CH(CH_3)O]_{10}H$  $Cl^{\ominus}$ | Montmorillonite (Kunipia F) | 5.19 | $9.1 \times 10^{8}$ |
| U | $CH_3-\overset{\overset{\displaystyle CH_2CH(CH_3)OC_8H_{17}}{\|}}{\underset{\underset{\displaystyle CH_2CH(CH_3)OC_8H_{17}}{\|}}{N^{\oplus}}}-CH_2CH(CH_3)OC_8H_{17}$  $Cl^{\ominus}$ | Montmorillonite (Kunipia F) | 3.69 | $1.0 \times 10^{11}$ |

TABLE I-3-continued

| Compound No. | Organic modifier | Layer silicate | Spacing *(nm) | Specific volume resistivity ($\Omega \cdot cm$) |
|---|---|---|---|---|
| V | $(CH_2CH_2O)_2CC_{17}H_{35}$<br>\|  \|\|<br>$CH_3-N^{\oplus}-CH_3$  O   $Cl^{\ominus}$<br>\|<br>$(CH_2CH_2O)_2CC_{17}H_{35}$<br>\|\|<br>O | Montmorillonite (Kunipia F) | 2.98 | $2.8 \times 10^{10}$ |
| W | $[CH_2CH(CH_3)O]_{10}H$<br>\|<br>$CH_3-N^{\oplus}-[CH_2CH(CH_3)O]_{10}H$<br>\|<br>$CH_2CH_2COC_{12}H_{25}$   $Cl^{\ominus}$<br>\|\|<br>O | Montmorillonite (Kunipia F) | 3.46 | $6.2 \times 10^9$ |
| X | $[EO/PO(1/2)]_{10}H$<br>\|<br>$CH_3-N^{\oplus}-[EO/PO(1/2)]_{10}H$<br>\|<br>$[EO/PO(1/2)]_{10}H$   $Cl^{\ominus}$ | Montmorillonite (Kunipia F) | 3.62 | $4.5 \times 10^9$ |
| Y | — | SPN (Coop Chemical) | 3.42 | $3.7 \times 10^9$ |
| Z | $CH_3$<br>\|<br>$C_{12}H_{25}-N^{\oplus}-[CH_2CH(CH_3)O]_{10}H$<br>\|<br>$CH_3$     $Cl^{\ominus}$ | — | — | — |

*Spacing means interplanar spacing.
(Note) In Compound X, EO represents $-CH_2CH_2O-$, PO represents $-CH_2CH(CH_3)O-$, and (1/2) indicates that EO/PO molar ratio is 1:2.

[Evaluation of properties]

The various organically-modified layer silicate compound-resin composites set forth in the following examples and comparative examples were evaluated for the following properties:

<Evaluation of dispersion of organically-modified layer silicate compound in resin>

Concerning an obviously homogeneous organically-modified layer silicate compound, only a primary aggregate or a secondary aggregate having a shortest diameter of not more than 500 nm are picked up from a plurality of 10,000 to 100,000 magnification-transmission electron micrographs (TEM; image obtained from a 100-nm thick specimen) of the resin composite at 3 or more different positions. From the sum of the area on TEM image occupied by these organically-modified layer silicate particle phases, the total area on TEM image occupied by the resin matrix phase and the density ($g/cm^3$) of the two phases, it is judged if the proportion of the organically-modified layer silicate particles satisfying the requirement (1) for the degree of dispersion falls within the range of from 2 to 30 parts by weight based on 100 parts by weight of the resin used [Evaluation (A)]. On the other hand, from a plurality of 10,000 to 100,000 magnification-TEM photographs, 200 numbers of 500 nm square divisions are randomly extracted. The probability of occurrence of different organically-modified layer silicate compound particles (primary aggregate particles in the case of independent primary aggregate; secondary aggregate is considered one particle in the case of secondary aggregate which forms a continuous phase) and/or two or more sections thereof in these divisions is then determined. A system in which this probability is not less than 50% is considered to meet the requirement (2) for the degree of dispersion [Evaluation (B); In practice, this evaluation includes the requirement (1) for the degree of dispersion or data concerning the amount of the organically-modified layer silicate compound and is often severer than the requirement (1) for the degree of dispersion]. Concerning a homogeneous organically-modified layer silicate compound-resin composite system, it can be said that if the resin composite system satisfies both the two evaluations (A) and (B), the organically-modified layer silicate compound is virtually dispersed in a proportion of from 2 to 30 parts by weight based on 100 parts by weight of the resin matrix in such an arrangement that both the two requirements (1) and (2) are met. In any of the two evaluations, concerning a resin composition system in which the organically-modified layer silicate compound contains a third component such as impermeable rubber-like particle, non-compatible resin particle phase and filler, the foregoing analysis is applied to the resin matrix position excluding these impermeable regions. However, a system which is not microscopically uniform but exhibits antistatic properties due to its uneven distribution of organically-modified layer silicate compound (e.g., Example I-4) is exceptionally not the target of this analysis. It has been confirmed that this system has an organically-modified layer silicate phase which occurs continually over a sufficiently large TEM field of view and meets the foregoing requirements (1) and (2) for the state of dispersion. The results are shown in Tables I-4 to I-7.

<Evaluation of antistatic properties of organically-modified layer silicate compound-resin composite>

For the evaluation of antistatic properties, the half-life period of charged voltage before and after washing with water/ethanol and specific volume resistivity were evaluated. For the measurement of the half-life period of charged voltage and the specific volume/surface resistivity of the organically-modified layer silicate compound-resin composite, a specimen which had been stored in a 23° C.-60% RH constant temperature-humidity chamber for 24 hours was used unless otherwise specified.

The confirmation of antistatic properties was conducted on the basis of the goal that the half-life period of charged voltage is not more than 15 seconds. The fact that antistatic properties are so-called "permanent antistatic properties" can be confirmed by thoroughly washing the specimen with water/ethanol, drying the specimen, and then re-measuring the half-life period of charged voltage. However, since the organically-modified layer silicate particles are extremely huge on a molecular basis and thus are virtually immobile in the resin, the foregoing confirmation can be replaced by the confirmation of the fact that the specific volume resistivity of the resin composite is lowered to not more than $10^{13}$ Ω·cm. For the measurement of the half-life period of charged voltage, Static Honestometer Type ES-5109 (available from Shishido Electrostatic Ltd.) was used. The results are shown in Tables I-4 to I-7.

For the measurement of the specific surface resistivity and specific volume resistivity of the organically-modified layer silicate compound-resin composition, Ultra High Resistance Meter R8340A and Resistivity Chamber R12702A available from Advantest Corp. were used. The measurement was effected in accordance with JIS K-6911.

EXAMPLE I-1

100 parts by weight of a random polypropylene (PP) resin "F658H" available from Grand Polymer Co., Ltd. were melt-kneaded with 5 parts by weight of Compound A by means of a twin-screw extruder "PCM45-33.5" available from Ikegai Corp. (190° C., 100 r.p.m.). The mixture thus extruded was subjected to melt pressing to form 10 specimens (100 mm×100 mm×1 mm) which were then measured for various properties. The Compound A-polypropylene composite thus obtained exhibited the same transparency as the resin alone (haze: 40). When visually observed, it was confirmed that the organically-modified layer silicate particles had been dispersed so uniformly that no particles were recognized and a good transparency was attained. All these specimens had a charged voltage half-life period of not more than 0.2 seconds, demonstrating that the present resin composite can exhibit sufficient antistatic properties. The specimens were washed with water/ethanol on the surface thereof, dried, and then measured for half-life period of charged voltage. The result was not more than 0.2 seconds, which was the same as obtained before washing. This demonstrates that the present resin composite has permanent antistatic properties. The present resin composite exhibited the same charged voltage half-life period even after 3 days of storage in a room temperature-5% RH glove compartment.

The Compound A-polypropylene composite exhibited a specific volume resistivity of $2.0 \times 10^{11}$ Ω·cm, which is a great drop from that of the resin alone. On the other hand, the Compound A-polypropylene composite exhibited a specific surface resistivity of $3.4 \times 10^{13}$ Ω (per square), which is a drop from that of the resin alone but deviates greatly from and is about hundreds of times the value analogized from the foregoing charged voltage half-life period in accordance with the common sense of "charged voltage half-life period-specific surface resistivity" relationship in the conventional low molecular active agent type antistatic agent-containing resin composite system or alloy type antistatic resin composite system. However, when the counter electrode on the back side of the specimen to be measured for specific surface resistivity was replaced by a teflon plate, a specific surface resistivity of $2.1 \times 10^{12}$ Ω (per square) was obtained. The fact that the 1 mm thick specimen exhibits such a specific surface resistivity value demonstrates that the present resin composite exhibits quite a uniform specific volume resistivity throughout the entire molded product.

Figure 1D:
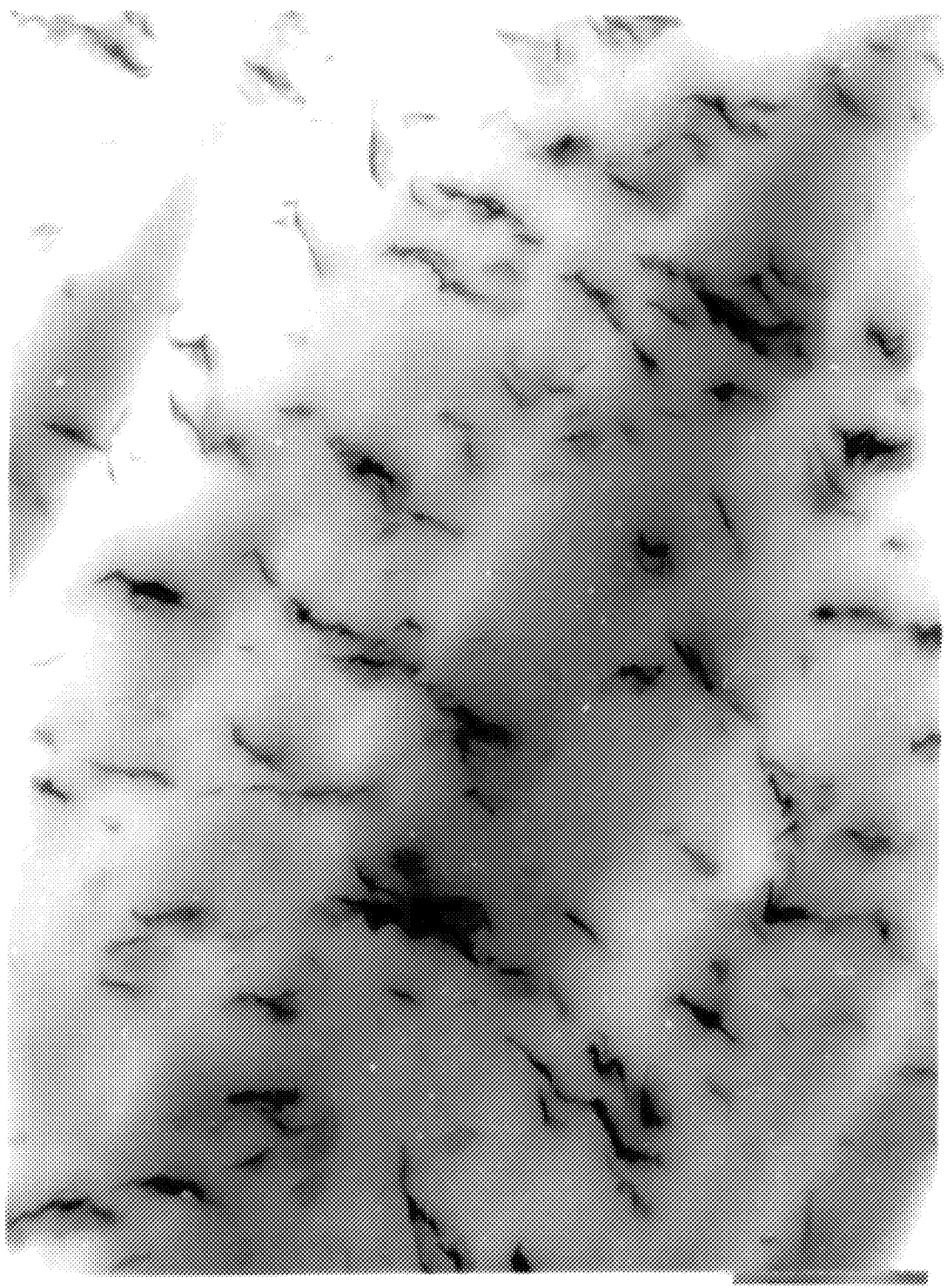
FIG. 1D is a transmission electron micrograph illustrating the particle structure of Compound A-polypropylene resin composition obtained in Example I-1.

A transmission electron micrograph image of the Compound A-polypropylene resin composite obtained in Example I-1 is shown in FIG. 1D. The organically-modified layer silicate compound A was dispersed in a polypropylene resin as a primary aggregate unit having a thickness of from several nanometer to scores of nanometer. No huge secondary aggregate particles having a short axis length of not less than 500 nm were found even on scores of different images. [Evaluation (A): G; The absence of huge secondary aggregates is responsible for the fact that the resin composite is visually transparent]. Although the added amount of Compound A was as small as 5 parts by weight, dissociated primary aggregates of organically-modified layer silicate were dispersed in the resin matrix in close to each other. There were no regions in which no organically-modifed layer silicate particles are found in a 1 μm square division. The probability of occurrence of two or more organically-modified layer silicate particles in 200 numbers of 500 nm square divisions randomly extracted from a plurality of TEM photographs of the same magnification was 67% [Evaluation (B): G]. The proportion of the organically-modified layer silicate compound satisfying the requirements (1) and (2) for the degree of dispersion in all Compound A was estimated at about 96%.

When subjected to X-ray diffractometry, the present resin composite exhibited an interplanar spacing of 2.83 nm, which is essentially the same as that of Compound A alone. Further, the present resin composite exhibited a sharp reflection. It is thought that Compound A was dispersed in the polypropylene resin while maintaining the primary aggregate structure almost completely without any significant swelling.

EXAMPLE I-2

To 100 parts by weight of a polyethylene (PE) resin "Sumikathene F208-1" available from Sumitomo Chemical Co., Ltd. were added 30 parts by weight of Compound A. The mixture was then melt-kneaded in the same manner as in Example I-1 (190° C., 100 r.p.m.). As a result, Compound A was dispersed in the polyethylene resin in a virtually clear state without leaving huge secondary aggregate particles having a short axis length of not less than 500 nm. The present resin composite exhibited a charged voltage half-life period of not more than 0.2 seconds and a specific volume resistivity of $7.6 \times 10^{10}$ Ω·cm. The present resin composite still exhibited a charged voltage half-life period of not more than 0.2 seconds after washed with water/ethanol on the surface thereof. In the present resin composite, Compound A was somewhat swelled (interplanar spacing: 3.15 nm).

EXAMPLE I-3

100 parts by weight of the organically-modified layer silicate compound-polyethylene resin composite obtained in Example I-2 were melt-kneaded with 385 parts by weight of a polyethylene resin at a temperature of 190° C. (100 r.p.m.). The resulting diluted resin composite exhibited a charged voltage half-life period of 0.7 seconds. It exhibited a charged voltage half-life period of 0.8 seconds after washed with water/ethanol. Thus, the present resin composite exhibited good permanent antistatic properties. The present resin composite also exhibited a specific volume resistivity of $3.6 \times 10^{11}$ $\Omega \cdot$cm.

EXAMPLE I-4

Figure 1E:
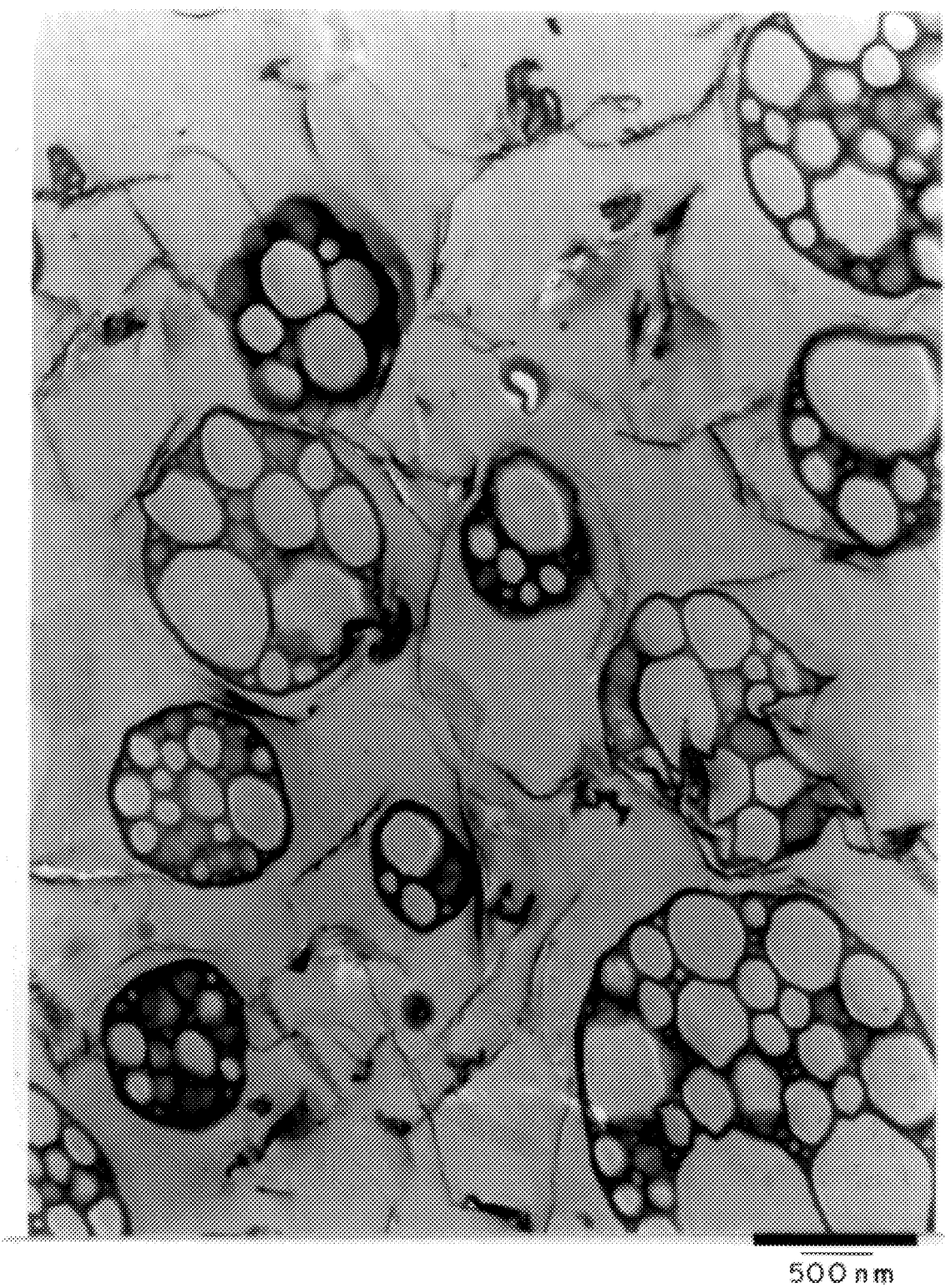
FIG. 1E is a transmission electron micrograph illustrating the particle structure of Compound B-HIPS composition obtained in Example I-4.

To 100 parts by weight of a high impact resistance polystyrene (HIPS) resin "H8652" available from Asahi Chemical Industry Co., Ltd. were added 2 parts by weight of Compound B. The mixture was then melt-kneaded in the same manner as in Example I-1 (220° C., 100 r.p.m.). The specific volume resistivity of the present resin composite was $6.5 \times 10^{11}$ $\Omega \cdot$cm. In the present resin composite, the organically-modified layer silicate compound indicated an exceptionally specific state of dispersion. A transmission electron micrograph of the Compound B-HIPS resin composite obtained in the present example is shown in FIG. 1E. In FIG. 1E, the portion dye with osmium oxide which constitutes a multiple phase is a polybutadiene phase incorporated in HIPS. Compound B was also shown forming a network made of a band or film-like structure having a short axis length (thickness) of 20 to 30 nm in the polystyrene matrix portion. This network itself forms an extremely huge secondary aggregate. In fact, this network can be easily recognized from one end of a TEM image of a lower magnification having a side length of 50 $\mu$m to the other along the continuous phase of Compound B or different aggregate particle phases of Compound B isolated at a distance of not more than 500 nm. In other words, it can be thought that Compound B, even if used in a small amount, forms an extremely efficient electrically-conductive passage that provides the resin with permanent antistatic properties. In the present resin composition, Compound B exhibited an interplanar spacing of 2.99 nm, which is a slight increase from that determined before being incorporated in the resin.

EXAMPLE I-5

To 100 parts by weight of an acrylonitrile-butadienestyrene copolymer (ABS resin) "Toyolac 100" available from Toray Industries, Inc. were added 3 parts by weight of Compound C. The mixture was then melt-kneaded in the same manner as in Example I-1 (220° C., 100 r.p.m.) to obtain a Compound C-ABS resin composite. In the present resin composition, Compound C exhibited an interplanar spacing of 3.4 nm, which is an increase from that determined before being incorporated in the resin.

EXAMPLE I-6

To 100 parts by weight of a homopolypropylene resin "Mitsui NOBLEN JHH-G" available from Mitsui Toatsu Chemicals, Inc. were added 5 parts by weight of Compound D. The mixture was then melt-kneaded in the same manner as in Example I-1 (200° C., 100 r.p.m.) to obtain a Compound D-polypropylene resin composite in the form of transparent compound. The probability of occurrence of 2 or more organically-modified layer silicate particles in 200 numbers of 500 nm square divisions randomly extracted from a plurality of TEM photographs was 70%.

EXAMPLE I-7

To 100 parts by weight of a filler-reinforced polypropylene resin "Sunlet TT7030" available from Mitsui Petrochemical Industries, Ltd. were added 5 parts by weight of Compound E. The mixture was then melt-kneaded in the same manner as in Example I-1 (200° C., 100 r.p.m.) to obtain a Compound E-(filler-containing) polypropylene resin composite. There have been no effective antistatic treatment processes for filler-containing polyolefin resin. The resin composite obtained in the present example exhibited a charged voltage half-life period of 2.8 seconds and a specific volume resistivity of $1.2 \times 10^{12}$ $\Omega \cdot$cm and thus showed good permanent antistatic properties.

EXAMPLE I-8

The procedure of Example I-1 was followed to obtain a transparent Compound F-polypropylene resin composite except that Compound F was used as an organically-modified layer silicate compound.

EXAMPLE I-9

To 100 parts by weight of a random polypropylene resin "F658H" were added 10 parts by weight of Compound G. The mixture was then kneaded at a temperature of 155° C. and 20 r.p.m. by means of a roll kneader available from Nishimura Koki K.K. for 15 minutes. The Compound G-polypropylene resin composite thus obtained was transparent and exhibited a specific volume resistivity of $6.4 \times 10^{12}$ $\Omega \cdot$cm.

COMPARATIVE EXAMPLE I-1

Figure 1F:
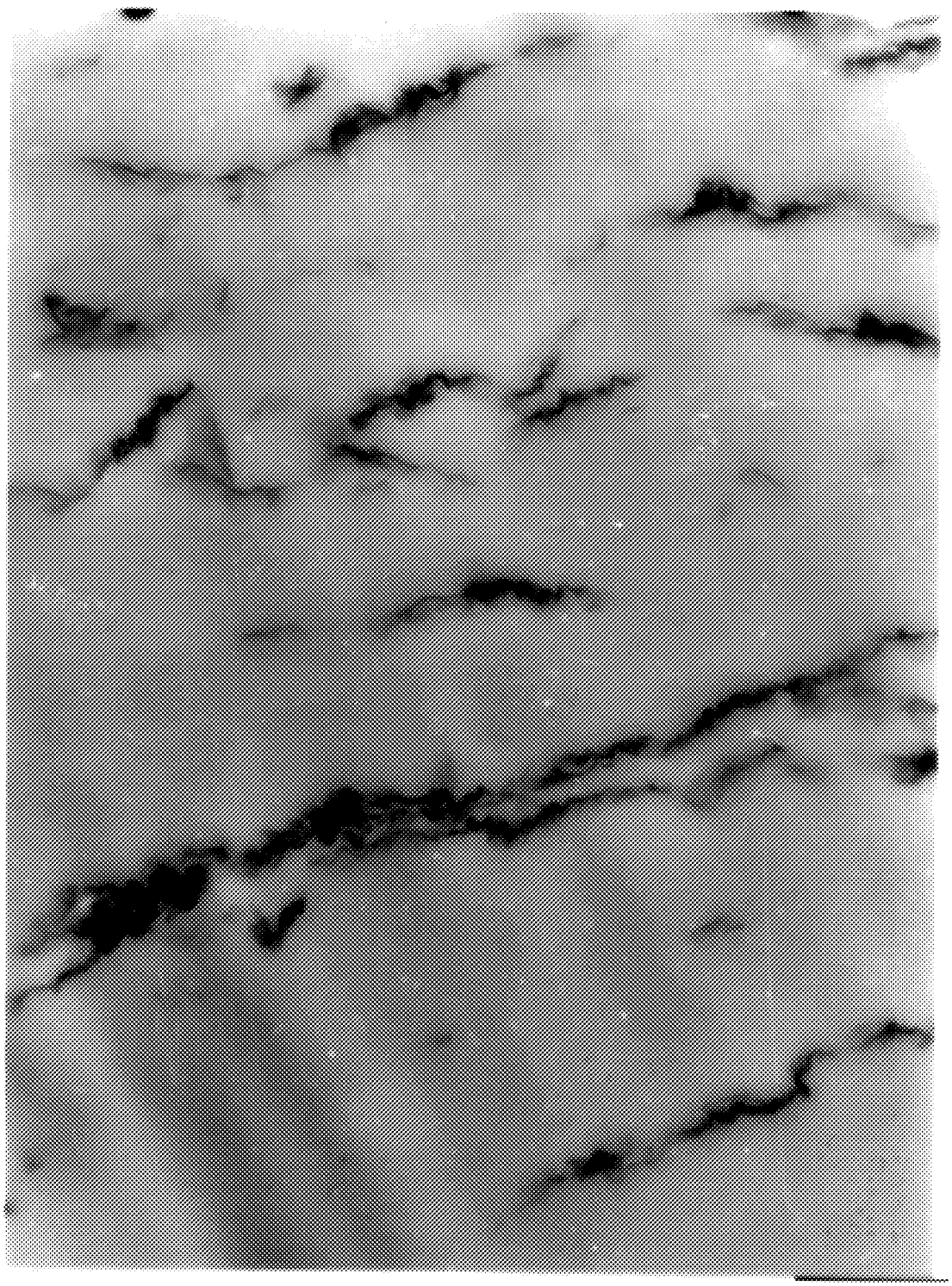
FIG. 1F is a transmission electron micrograph illustrating the particle structure of Compound G-polypropylene resin composition obtained in Comparative Example I-1.

The procedure of Example I-9 was followed to obtain a Compound G-polypropylene resin composite except that the kneading time was 5 minutes. The resin composite thus obtained was observed slightly cloudy but was almost transparent. However, on TEM photograph (FIG. 1F), many regions in which Compound G dissociated into primary aggregate units don't diffuse are found. The majority of Compound G is present as an elongated secondary aggregate. The image analysis shows that about 10% of Compound G is present as a secondary aggregate having a short axis length of not less than 1 $\mu$m. The probability of occurrence of 2 or more organically-modified layer silicate particles in 200 mumbers of randomly extracted 500 nm square divisions was only 25%. The present resin composite exhibited a charged voltage half-life period of not less than 30 seconds and a specific volume resistivity of $8.1 \times 10^{13}$ $\Omega \cdot$cm.

COMPARATIVE EXAMPLE I-2

100 parts by weight of a random polypropylene resin "F658H" were kneaded with Compound G in such an amount that the inorganic content in the resin reached 5.4 wt-% in the manner described in "transactions of The 4th Forum of Polymer Material", page 294. The resulting resin composite was visually observed to have particles of Compound G throughout the system. The present resin composite also exhibited a haze of 55, which is an increase from that of the resin alone, i.e., 40. On TEM photograph, Compound G is present as an almost band-like secondary aggregate (short axis length: 200 nm to 2 $\mu$m). Huge aggregate particles having a short axis length of not less than 3 $\mu$m were observed throughout the system as well. The state of dispersion of the organically-modified layer silicate compound was extremely poor. The probability of occurrence of 2 or more organically-modified layer silicate particles in randomly extracted 200 numbers of 500 nm square divisions was only 13%. The present resin composite exhibited a specific volume resistivity of $1.2 \times 10^{14}$ $\Omega \cdot$cm.

COMPARATIVE EXAMPLE I-3

The procedure of Example I-1 was followed to obtain a Compound H-polypropylene resin composite except that Compound H was used instead of Compound A. The present resin composite looked cloudy due to the occurrence of undissociated particles of Compound H. When observed under TEM, the present resin composite was confirmed to have huge secondary aggregates of Compound H having a size of from several micrometer to hundreds of micrometer throughout the system. Little or no dispersion of primary aggregates of Compound H was observed in the resin matrix. The probability of occurrence of 2 or more organically-modified lamellar silicate particles in randomly extracted 200 numbers of 500 nm square divisions was only 0.5%. The present resin composite exhibited a specific volume resistivity of $5.2\times10^{15}$ $\Omega\cdot$cm.

COMPARATIVE EXAMPLE I-4

The procedure of Example I-1 was followed to obtain a Compound I-polypropylene resin composite except that Compound I was used instead of Compound A. The present resin composite looked cloudy due to the occurrence of undissociated particles of Compound I. When observed under TEM, the present resin composite was confirmed to have huge secondary aggregates of Compound I having a size of from several micrometer to hundreds of micrometer throughout the system. Little or no dispersion of primary aggregates of Compound I was observed in the resin matrix. The probability of occurrence of 2 or more organically-modified layer silicate particles in randomly extracted 200 numbers of 500 nm square divisions was only 1%. The present resin composite exhibited a specific volume resistivity of $7.7\times10^{15}$ $\Omega\cdot$cm.

COMPARATIVE EXAMPLE I-5

The procedure of Example I-1 was followed to obtain a Compound J-polypropylene resin composite except that Compound J was used instead of Compound A. The present resin composite looked cloudy due to the occurrence of undissociated particles of Compound J. When observed under TEM, the present resin composite was confirmed to have huge secondary aggregates of Compound J having a size of from several micrometer to hundreds of micrometer throughout the system. The primary aggregates of Compound J in the resin matrixwere observed only in the vicinity of huge secondary aggregates. The probability of occurrence of 2 or more organically-modified layer silicate particles in randomly extracted 200 numbers of 500 nm square divisions was only 11%. The present resin composite exhibited a specific volume resistivity of $6.3\times10^{13}$ $\Omega\cdot$cm.

COMPARATIVE EXAMPLE I-6

The procedure of Example I-1 was followed to obtain a Compound K-polypropylene resin composite except that Compound K was used instead of Compound A. The present resin composite looked cloudy due to the occurrence of undissociated particles of Compound K. When observed under TEM, the present resin composite was confirmed to have huge secondary aggregates of Compound K having a size of from several micrometer to hundreds of micrometer throughout the system. Little or no dispersion of primary aggregates of Compound K was observed in the resin matrix. The probability of occurrence of 2 or more organically-modified layer silicate particles in randomly extracted 200 numbers of 500 nm square divisions was only 3%. The present resin composite exhibited a specific volume resistivity of $2.2\times10^{14}$ $\Omega\cdot$cm.

COMPARATIVE EXAMPLE I-7

The procedure of Example I-1 was followed to obtain a Compound L-polypropylene resin composite except that unmodified montmorillonite "Kunipia F" (Compound L) was used instead of Compound A. The present resin composite looked cloudy due to the occurrence of undissociated particles of Compound L. When observed under TEM, the present resin composite was confirmed to have huge secondary aggregates of Compound L having a size of from several micrometer to hundreds of micrometer throughout the system. No dispersion of primary aggregates of Compound L was observed in the resin matrix. The probability of occurrence of 2 or more organically-modified layer silicate particles in randomly extracted 200 numbers of 500 nm square divisions was 0%. The present resin composite exhibited a specific volume resistivity of $10^{16}$ $\Omega\cdot$cm or more.

COMPARATIVE EXAMPLE I-8

In accordance with the process (process proposed by Otani et al.) described in "transactions of The 38th Forum of Clay Science", page 52, an organically-modified layer silicate "SAN" (Compound M) available from Coop Chemical Co., Ltd. was added to a polypropylene resin to obtain a polypropylene resin composite comprising Compound M incorporated therein in an amount of 3 wt-%. The present resin composite looked cloudy due to the occurrence of undissociated particles of Compound M. When observed under TEM, the present resin composite was confirmed to have huge secondary aggregates of Compound M having a size of from several micrometer to hundreds of micrometer throughout the system. Little or no dispersion of primary aggregates of Compound M was observed in the resin matrix. The probability of occurrence of 2 or more organically-modified layer silicate particles in randomly extracted 200 numbers of 500 nm square divisions was only 8%. The present resin composite exhibited a specific volume resistivity of $2.8\times10^{14}$ $\Omega\cdot$cm.

COMPARATIVE EXAMPLE I-9

The procedure of Example I-1 was followed to obtain a Compound N-polyethylene resin composite except that a polyethylene resin "Sumikathene F208-1" was used instead of the random polypropylene resin and 10 parts by weight of "BENTONE 52" (Compound N) available from RHEOX, INC. was used instead of 5 parts by weight of Compound A. The present resin composite looked cloudy due to the occurrence of undissociated particles of Compound N. When observed under TEM, the present resin composite was confirmed to have huge secondary aggregates of Compound N having a size of from several micrometer to hundreds of micrometer throughout the system. A slight dispersion of primary aggregates of Compound N was observed in the resin matrix. The probability of occurrence of 2 or more organically-modified layer silicate particles in randomly extracted 200 numbers of 500 nm square divisions was only 21%. The present resin composite exhibited a specific volume resistivity of $5.6\times10^{13}$ $\Omega\cdot$cm.

COMPARATIVE EXAMPLE I-10

The procedure of Example I-1 was followed to obtain a Compound O-polypropylene resin composite except that 1.5 parts by weight of tetra-n-decylammonium bromide (Compound O) were used instead of 5 parts by weight of Compound A. The present resin composite looked transparent shortly after molded but looked slightly cloudy on the surface thereof after 3 days. The present resin composite exhibited a charged voltage half-life period of not less than 30 seconds, a specific surface resistivity of not less than $10^{15}$ $\Omega$ (per square) and a specific volume resistivity of not less than $10^{16}$ $\Omega\cdot$cm or more.

EXAMPLE I-10

To 100 parts by weight of an ABS resin "Toyolac 100" were added 5 parts by weight of Compound P. The mixture was then melt-kneaded at a temperature of 220° C. in the same manner as in Example I-1. As a result of TEM analysis, about 15% of Compound P was observed dissociated into primary aggregate units in the Compound P-ABS resin composite thus obtained. The rest of Compound P was observed uniformly dispersed in the resin matrix in the form of secondary aggregate having a short axis length of not more than about 100 nm. The probability of occurrence of 2 or more organically-modified layer silicate particles in randomly extracted 200 numbers of 500 nm square divisions was 90%. (X-ray analysis showed that Compound P had swollen to an interplanar spacing of 4.57 nm in the present resin composite.)

It was confirmed that the present resin composite exhibits a charged voltage half-life period of 0.6 seconds, which was increased to 4.2 second after washed with water/ethanol, and a specific volume resistivity of $7.5 \times 10^{11}$ Ω·cm, demonstrating that it has permanent antistatic properties. Although Compound P was uniformly dispersed in the resin, the present resin composite made of a 1 mm thick specimen exhibited a specific surface resistivity of $4.5 \times 10^{11}$ (per square). However, the specific surface resistivity of the present resin composite was increased to $3.8 \times 10^{13}$ Ω (per square) at a half day of storage at a humidity of 5% in a glove compartment. The charged voltage half-life period and the specific volume resistivity of the present resin composite were increased to 7 seconds and $2.1 \times 10^{12}$ Ω·cm, respectively, after the storage. The antistatic properties of the present resin composite were slightly lowered as compared with that determined under the standard conditions but still fell within the desirable range.

EXAMPLE I-11

To 100 parts by weight of a polystyrene (PSt) resin "GP666" available from Asahi Chemical Industry Co., Ltd. were added 5 parts by weight of Compound Q. The mixture was then kneaded at a temperature of 200° C. in the same manner as in Example I-10 to obtain a Compound Q-polystyrene resin composite. As a result of TEM analysis, about 30% of Compound Q was observed dissociated into primary aggregate units in the Compound P-ABS resin composite thus obtained. The rest of Compound Q was observed uniformly dispersed in the resin matrix in the form of secondary aggregate having a short axis length of not more than about 100 nm. The probability of occurrence of 2 or more organically-modified layer silicate particles in randomly extracted 200 numbers of 500 nm square divisions was 72%. The present resin composite exhibited a charged voltage half-life period of 4.2 seconds, which was increased to 7.2 seconds after washed with water/ethanol.

EXAMPLE I-12

The procedure of Example I-10 was followed to obtain a Compound R-ABS resin composite except that 7 parts by weight of Compound R were used instead of 5 parts by weight of Compound P. As a result of TEM analysis, about 30% of Compound R was observed dissociated into primary aggregate units in the Compound R-ABS resin composite thus obtained. The rest of Compound R was observed uniformly dispersed in the resin matrix in the form of secondary aggregate having a short axis length of not more than about 100 nm. The probability of occurrence of 2 or more organically-modified layer silicate particles in randomly extracted 200 numbers of 500 nm square-divisions was 90%. The present resin composite exhibited a charged voltage half-life period of not more than 0.2 seconds and further a charge voltage half-life period of not more than 0.2 seconds even after washed with water/ethanol.

EXAMPLE I-13

To 100 parts by weight of a polyethylene (PET) resin "Kurapet 1030" available from Kuraray Co., Ltd. were added 10 parts by weight of Compound S. The mixture was then kneaded at a temperature of 270° C. in the same manner as in Example I-10 to obtain a Compound S-PET resin composite. As a result of TEM analysis, about 80% or more of Compound S was observed uniformly dispersed in the resin matrix in the Compound S-PET resin composite thus obtained in the form of secondary aggregate having a short axis length of scores of nanometer to 200 nm. The probability of occurrence of 2 or more organically-modified layer silicate particles in randomly extracted 200 numbers of 500 nm square divisions was 77%. The present resin composite exhibited a specific volume resistivity of $7.3 \times 10^{11}$ Ω·cm.

EXAMPLE I-14

The procedure of Example I-10 was followed to obtain a Compound T-ABS resin composite except that Compound T was used instead of Compound P. The present resin composite exhibited a specific volume resistivity of $5.0 \times 10^{9}$ Ω·cm.

EXAMPLE I-15

To 100 parts by weight of a polymethyl methacrylate (PMMA) resin "DELPET 560F" available from Asahi Chemical Industry Co., Ltd. were added 7 parts by weight of Compound U. The mixture was then kneaded at a temperature of 210° C. in the same manner as in Example I-10 to obtain a Compound U-PMMA resin composite which was slightly cloudy but is essentially transparent. The probability of occurrence of 2 or more organically-modified layer silicate particles in randomly extracted 200 numbers of 500 nm square divisions on TEM photograph was 69%. The present resin composite exhibited a specific volume resistivity of $8.1 \times 10^{12}$ Ω·cm.

EXAMPLE I-16

The procedure of Example I-15 was followed to obtain a Compound V-PMMA resin composite except that Compound V was used instead of Compound U. The present resin composite exhibited a specific volume resistivity of $3.6 \times 10^{11}$ Ω·cm.

EXAMPLE I-17

5 parts by weight of Compound W, 100 parts by weight of a styrene monomer which had been freed of inhibitor and then purified by distillation under reduced pressure and 0.4 parts by weight of a polymerization initiator "V-59" available from Wako Pure Chemical Industries, Ltd. were added to 200 parts by weight of toluene which had been dried and then purified by distillation in an atmosphere of argon. The reaction mixture was then allowed to undergo polymerization with stirring at a temperature of 75° C. in an atmosphere of argon for 12 hours. After allowed to cool, the mixture was poured into a large amount of hexane. The resulting precipitate was purified by sedimentation from toluene and hexane. When the resulting white Compound W-polystyrene resin composite was melt-molded, it remained slightly cloudy but turned almost transparent. On TEM photograph, the majority of Compound W was present in the form of secondary aggregate having a short axis length of from 50 to 200 nm. The probability of occurrence of 2 or more organically-modified layer silicate particles in randomly extracted 200 numbers of 500 nm square divisions on TEM photograph was 64%. The present resin composite exhibited a specific volume resistivity of $4.1 \times 10^{12}$ Ω·cm.

EXAMPLE I-18

10 parts by weight of Compound Q were added to 100 parts by weight of a 10:1 mixture of a glycerin type polyether polyol (OHV=235; available from Mitsui Petrochemical Industries, Ltd.) and ethylene glycol. The mixture was then stirred at a temperature of 60° C. for 1 hour to undergo dispersion. To the composition were then added 97.2 parts by weight of a polyfunctional isocyanate monomer "TR-50" available from Mitsui Petrochemical Industries, Ltd. and 1 part by weight of a polymerization catalyst "Kaoriser No. 1" available from Kao Corp. The mixture was then developed into a 100 mm×100 mm×5 mm mold where it was then allowed to undergo reaction at a temperature of 50° C. for 24 hours to obtain a Compound Q-crosslinked polyurethane (PU) resin composite. As a result of observation under TEM, the majority of Compound Q was shown present in the form of secondary aggregate having a short axis length of from scores of nanometer to 500 nm in the resin composite.

EXAMPLE I-19

The procedure of Example I-18 was followed to obtain a Compound X-crosslinked polyurethane resin composite except that Compound X was used instead of Compound Q. As a result of TEM analysis, the majority of Compound X was observed present in the form of secondary aggregate having a short axis length of from scores of nanometer to 500 nm in the Compound X-crosslinked polyurethane resin composite. The probability of occurrence of 2 or more organically-modified layer silicate particles in randomly extracted 200 numbers of 500 nm square divisions was 81%. The present resin composite exhibited a charged voltage half-life period of 0.8 seconds, which was increased to 3.4 seconds after washed with water/ethanol.

EXAMPLE I-20

50 parts by weight of maleic anhydride and 128 parts by weight of bisphenol A were stirred at a temperature of 150° C. in the stream of argon for 1 hour, and then heated to a temperature of 210° C. where they were then allowed to undergo reaction while the resulting water was being removed for 2 hours. After allowed to cool, the resulting unsaturated polyester resin was crushed. The crushed polyester resin and 23 parts by weight of Compound X were added to 300 parts by weight of a styrene monomer. The mixture was then stirred for 30 minutes. To the mixture were then added 10 parts by weight of benzoyl peroxide and 2.5 parts by weight of dimethylaniline. The mixture was developed into a 100 mm×100 mm×5 mm mold where it was then allowed to stand at a temperature of 40° C. for 3 hours to undergo polymerization. As a result of TEM analysis, the majority of Compound X was present in the form of secondary aggregate having a short axis length of from scores of nanometer to 500 nm in the Compound X-unsaturated polyester resin composite thus obtained. The present resin composite exhibited a specific volume resistivity of $5.4 \times 10^{11}$ Ω·cm.

COMPARATIVE EXAMPLE I-11

To 100 parts by weight of a homopolypropylene resin "Mitsui NOBLRN JHH-G" were added 7 parts by weight of an organically-modified layer silicate "SPN (Compound Y)" available from Coop Chemical Co., Ltd. The mixture was then kneaded in the same manner as in Example I-10 at a temperature of 200° C. to obtain a Compound Y-polypropylene resin composite. In the present resin composite, the particulate Compound Y was visually found throughout the system. However, when subjected to TEM analysis, not less than 80% of Compound Y was observed unevenly distributed in the resin matrix in the form of secondary aggregate having a short axis length of from 1 μm to 100 and scores of micrometer. The probability of occurrence of 2 or more organically-modified layer silicate particles in randomly extracted 200 numbers of 500 nm square divisions was only 8%. The present resin composite exhibited a charged voltage half-life period of not less than 30 seconds, demonstrating that it has no antistatic properties.

COMPARATIVE EXAMPLE I-12

To 100 parts by weight of a polystyrene resin "GP666" were added 7 parts by weight of Compound V. The mixture was then kneaded at a temperature of 200° C. in the same manner as in Example I-11 to obtain a Compound V-polystyrene resin composite. When subjected to TEM analysis, not less than 80% of Compound V was observed unevenly distributed in the resin matrix in the form of secondary aggregate having a minor axis length of from 1 μm to 100 and scores of micrometer. The probability of occurrence of 2 or more organically-modified layer silicate particles in randomly extracted 200 500 nm square divisions was only 10%. The present resin composite exhibited a charged voltage half-life period of not less than 30 seconds, demonstrating that it has no antistatic properties.

COMPARATIVE EXAMPLE I-13

The procedure of Comparative Example I-11 was followed to obtain a Compound W-polypropylene resin composite except that 7 parts by weight of Compound W were used instead of Compound Y. The present resin composite looked cloudy due to the occurrence of undissociated particles of Compound W. When observed under TEM, the present resin composite was confirmed to have huge secondary aggregates of Compound W having a size of from several micrometer to hundreds of micrometer throughout the system. Little or no dispersion of primary aggregates of Compound W was observed in the resin matrix. The probability of occurrence of 2 or more organically-modified layer silicate particles in randomly extracted 200 numbers of 500 nm square divisions was only 9%. The present resin composition exhibited a specific volume resistivity of $7.9 \times 10^{13}$ Ω·cm.

COMPARATIVE EXAMPLE I-14

To 100 parts by weight of an ABS resin "Toyolac 100" were added 0.3 parts by weight of dodecyldimethyl polyoxypropylene ammonium chloride (Compound Z). The mixture was then treated in the same manner as in Example I-10 to obtain a Compound Z-ABS resin composite. Immediately after molded, the present resin composite exhibited a specific surface resistivity of $3.2 \times 10^{15}$ Ω (per square), which was lowered to $2.8 \times 10^{12}$ Ω (per square) after 30 days of storage at room temperature, demonstrating that it has antistatic properties, though poor. However, the present resin composite exhibited a specific surface resistivity of not less than $10^{16}$ Ω (per square) after washing one side of the molded product with water/ethanol and dried.

COMPARATIVE EXAMPLE I-15

Only a random polypropylene resin "F658H" was passed through a twin-screw extruder at a temperature of 190° C. (100 r.p.m.), and then treated in the same manner as in Example I-1 to prepare polypropylene resin specimens. The present resin exhibited a charged voltage half-life period of not less than 30 seconds and a specific volume resistivity of not less than $10^{16}$ Ω·cm, demonstrating that it has high insulating properties.

COMPARATIVE EXAMPLE I-16

Only a homopolypropylene resin "Mitsui Norbrene JHH-G" was passed through a twin-screw extruder at a temperature of 200° C. (100 r.p.m.), and then treated in the same manner as in Example I-1 to prepare polypropylene resin specimens. The present resin exhibited a charged voltage half-life period of not less than 30 seconds and a specific volume resistivity of not less than $10^{16}$ Ω·cm, demonstrating that it has high insulating properties.

COMPARATIVE EXAMPLE I-17

Only a filler-reinforced polypropylene resin "Sunlet TT7030" was passed through a twin-screw extruder at a temperature of 200° C. (100 r.p.m.), and then treated in the same manner as in Example I-1 to prepare (filler-containing) polypropylene resin specimens. The present resin exhibited a charged voltage half-life period of not less than 30 seconds and a specific volume resistivity of not less than $10^{16}$ Ω·cm, demonstrating that it has high insulating properties.

COMPARATIVE EXAMPLE I-18

Only a polyethylene resin "Sumikathene F208-1" was passed through a twin-screw extruder at a temperature of 200° C. (85 r.p.m.), and then treated in the same manner as in Example I-1 to prepare polyethylene resin specimens. The present resin exhibited a charged voltage half-life period of not less than 30 seconds and a specific volume resistivity of not less than $10^{16}$ Ω·cm, demonstrating that it has high insulating properties.

COMPARATIVE EXAMPLE I-19

Only an HIPS resin "H8652" was passed through a twin-screw extruder at a temperature of 220° C. (100 r.p.m.), and then treated in the same manner as in Example I-1 to prepare HIPS resin specimens. The present resin exhibited a charged voltage half-life period of not less than 30 seconds and a specific volume resistivity of not less than $10^{16}$ Ω·cm, demonstrating that it has high insulating properties.

COMPARATIVE EXAMPLE I-20

Only an ABS resin "Toyolac 100" was passed through a twin-screw extruder at a temperature of 220° C. (85 r.p.m.), and then treated in the same manner as in Example I-1 to prepare ABS resin specimens. The present resin exhibited a charged voltage half-life period of not less than 30 seconds and a specific volume resistivity of not less than $10^{16}$ Ω·cm, demonstrating that it has high insulating properties.

COMPARATIVE EXAMPLE I-21

Only a polystyrene resin "GP666" was passed through a twin-screw extruder at a temperature of 200° C. (100 r.p.m.), and then treated in the same manner as in Example I-1 to prepare polystyrene resin specimens. The present resin exhibited a charged voltage half-life period of not less than 30 seconds and a specific volume resistivity of not less than $10^{16}$ Ω·cm, demonstrating that it has high insulating properties.

COMPARATIVE EXAMPLE I-22

Only a PMMA resin "Terpet 560F" was passed through a twin-screw extruder at a temperature of 210° C. (100 r.p.m.), and then treated in the same manner as in Example I-1 to prepare PMMA resin specimens. The present resin exhibited a charged voltage half-life period of not less than 30 seconds and a specific volume resistivity of $2\times10^{15}$ Ω·cm, demonstrating that it has high insulating properties.

COMPARATIVE EXAMPLE I-23

Only a PET resin "Kurapet 1030" was passed through a twin-screw extruder at a temperature of 270° C. (100 r.p.m.), and then treated in the same manner as in Example I-1 to prepare PET resin specimens. The present resin exhibited a charged voltage half-life period of not less than 30 seconds and a specific volume resistivity of $7.8\times10^{14}$ Ω·cm, demonstrating that it has high insulating properties.

COMPARATIVE EXAMPLE I-24

The procedure of Example I-18 was followed to obtain a crosslinked polyurethane resin except that Compound Q was not used. The present resin exhibited a charged voltage half-life period of not less than 30 seconds and a specific volume resistivity of $7.9\times10^{12}$ Ω·cm, demonstrating that it has high insulating properties.

COMPARATIVE EXAMPLE I-25

The procedure of Example I-20 was followed to obtain an unsaturated polyester resin except that Compound X was not used. The present resin exhibited a charged voltage half-life period of not less than 30 seconds and a specific volume resistivity of $6.4\times10^{13}$ Ω·cm, demonstrating that it has high insulating properties.

TABLE I-4

| | | Compound | | | Degree of dispersion of organically-modified layer silicate compound | | Half-life period of charged voltage (sec) | Half-life period of charged voltage after washed (sec) |
|---|---|---|---|---|---|---|---|---|
| Example No. | Resin | Kind | Added amount (parts) | Dispersing method | Short axis length of aggregate | Average minimum interparticle distance | | |
| Example 1 | Random PP | A | 5 | Twin screw extruder | G | G | ≦0.2 | ≦0.2 |
| Example 2 | PE | A | 30 | Twin screw extruder | G | G | ≦0.2 | ≦0.2 |

TABLE I-4-continued

| Example No. | Resin | Compound Kind | Compound Added amount (parts) | Dispersing method | Degree of dispersion of organically-modified layer silicate compound Short axis length of aggregate | Degree of dispersion of organically-modified layer silicate compound Average minimum interparticle distance | Half-life period of charged voltage (sec) | Half-life period of charged voltage after washed (sec) |
|---|---|---|---|---|---|---|---|---|
| Example 3 | PE | A | 5 | Twin screw extruder | G | G | 0.7 | 0.8 |
| Example 4 | HIPS | B | 2 | Twin screw extruder | G | G | 0.5 | 0.5 |
| Example 5 | ABS | C | 3 | Twin screw extruder | G | G | 0.5 | 0.4 |
| Example 6 | Homo PP | D | 5 | Twin screw extruder | G | G | 5.4 | 6.8 |
| Example 7 | Fillered PP | E | 5 | Twin screw extruder | G | G | 2.8 | 3.1 |
| Example 8 | Random PP | F | 5 | Twin screw extruder | G | G | 5.2 | 4.9 |
| Example 9 | Random PP | G | 10 | Roll kneader (15 min.) | G | G | 9.0 | 9.2 |
| Comparative Example 1 | Random PP | G | 10 | Roll kneader (5 min.) | G | P | $\geq 30$ | $\geq 30$ |
| Comparative Example 2 | Random PP | G | 9 | Laboplasto-mill | P | P | $\geq 30$ | $\geq 30$ |
| Comparative Example 3 | Random PP | H | 5 | Twin screw extruder | P | P | $\geq 30$ | $\geq 30$ |

TABLE I-5

| Example No. | Resin | Compound Kind | Compound Added amount (parts) | Dispersing method | Degree of dispersion of organically-modified layer silicate compound Short axis length of aggregate | Degree of dispersion of organically-modified layer silicate compound Average minimum interparticle distance | Half-life period of charged voltage (sec) | Half-life period of charged voltage after washed (sec) |
|---|---|---|---|---|---|---|---|---|
| Comparative Example 4 | Random PP | I | 5 | Twin screw extruder | P | P | $\geq 30$ | $\geq 30$ |
| Comparative Example 5 | Random PP | J | 5 | Twin screw extruder | P | P | $\geq 30$ | $\geq 30$ |
| Comparative Example 6 | Random PP | K | 5 | Twin screw extruder | P | P | $\geq 30$ | $\geq 30$ |
| Comparative Example 7 | Random PP | L | 5 | Twin screw extruder | P | P | $\geq 30$ | $\geq 30$ |
| Comparative Example 8 | PP | M | 3 wt-% | Process by Otani et al. | P | P | $\geq 30$ | $\geq 30$ |
| Comparative Example 9 | PE | N | 10 | Twin screw extruder | P | P | $\geq 30$ | $\geq 30$ |
| Comparative Example 10 | O | O | 1.5 | Twin screw extruder | — | — | $\geq 30$ | $\geq 30$ |
| Example 10 | ABS | P | 5 | Twin screw extruder | G | G | 0.6 | 4.2 |
| Example 11 | PSt | Q | 5 | Twin screw extruder | G | G | 4.2 | 7.3 |
| Example 12 | ABS | Q | 7 | Twin screw extruder | G | G | $\leq 0.2$ | $\leq 0.2$ |
| Example 13 | PET | S | 10 | Twin screw extruder | G | G | 0.8 | 7.2 |
| Example 14 | ABS | T | 5 | Twin screw extruder | G | G | 0.5 | 3.8 |

TABLE I-6

| Example No. | Resin | Compound Kind | Compound Added amount (parts) | Dispersing method | Degree of dispersion of organically-modified layer silicate compound — Short axis length of aggregate | Degree of dispersion of organically-modified layer silicate compound — Average minimum interparticle distance | Half-life period of charged voltage (sec) | Half-life period of charged voltage after washed (sec) |
|---|---|---|---|---|---|---|---|---|
| Example 15 | PMMA | U | 7 | Twin screw extruder | G | G | 11.2 | 12.4 |
| Example 16 | PMMA | V | 7 | Twin screw extruder | G | G | 8.7 | 10.0 |
| Example 17 | PSt | W | 5 | Added during synthesis of resin | G | G | 4.1 | 11.2 |
| Example 18 | Cross-liked PU | Q | 5 | Added during synthesis of resin | G | G | 1.1 | 9.8 |
| Example 19 | Cross-linked PU | X | 5 | Added during synthesis of resin | G | G | 0.8 | 3.4 |
| Example 20 | Unsaturated PES | X | 5 | Added during synthesis of resin | G | G | 1.3 | 1.5 |
| Comparative Example 11 | Homo PP | Y | 7 | Twin screw extruder | P | P | ≧30 | ≧30 |
| Comparative Example 12 | PSt | V | 7 | Twin screw extruder | P | P | ≧30 | ≧30 |
| Comparative Example 13 | Homo PP | W | 7 | Twin screw extruder | P | P | ≧30 | ≧30 |
| Comparative Example 14 | ABS | Z | 0.3 | Twin screw extruder | — | — | ≧30 | ≧30 |

TABLE I-7

| Example No. | Resin | Compound Kind | Compound Added ammount (parts) | Dispersing method | Degree of dispersion of organically-modified layer silicate — Short axis length of aggregate | Degree of dispersion of organically-modified layer silicate — Average minimum interparticle distance | Half-life period of charged voltage (sec) | Half-life period of charged voltage after washed (sec) | Specific volume resistivity (Ω · cm) |
|---|---|---|---|---|---|---|---|---|---|
| Comparative Example 15 | Random PP | — | — | — | — | — | ≧30 | ≧30 | ≧$10^{16}$ |
| Comparative Example 16 | Homo PP | — | — | — | — | — | ≧30 | ≧30 | ≧$10^{16}$ |
| Comparative Example 17 | Fillered PP | — | — | — | — | — | ≧30 | ≧30 | ≧$10^{16}$ |
| Comparative Example 18 | PE | — | — | — | — | — | ≧30 | ≧30 | ≧$10^{16}$ |
| Comparative Example 19 | HIPS | — | — | — | — | — | ≧30 | ≧30 | ≧$10^{16}$ |
| Comparative Example 20 | ABS | — | — | — | — | — | ≧30 | ≧30 | ≧$10^{16}$ |
| Comparative Example 21 | PSt | — | — | — | — | — | ≧30 | ≧30 | ≧$10^{16}$ |
| Comparative Example 22 | PMMA | — | — | — | — | — | ≧30 | ≧30 | $2.0 \times 10^{15}$ |
| Comparative Example 23 | PET | — | — | — | — | — | ≧30 | ≧30 | $7.8 \times 10^{14}$ |
| Comparative Example 24 | Cross-linked PU | — | — | — | — | — | ≧30 | ≧30 | $2.0 \times 10^{12}$ |
| Comparative Example 25 | Unsaturated PES | — | — | — | — | — | ≧30 | ≧30 | $6.4 \times 10^{13}$ |

(Note)
*1: The amount of compound is represented by parts by weight based on 100 parts by weight of resin.
*2: The symbols in the column of short axis length of aggregate and average minimum interparticle distance have the following meaning:
(A) Minor axis length of aggregate
G: The fraction of primary aggregates and secondary aggregates having a short axis length of not more than 500 nm falls within the range of from 2 to 30 parts by weight based on 100 parts by weight of resin matrix.
P: The fraction of primary aggregates and secondary aggregates having a short axis length of not more than 500 nm falls less than 2 parts by weight based on 100 parts by weight of resin matrix.
(B) Average minimum interparticle distance
G: The probability of occurrence of 2 or more particles in a 500 nm square division is not less than 50%.
P: The probability of occurrence of 2 or more particles in a 500 nm square division is less than 50%.

EXAMPLE II

EXAMPLE II-1

(a) Synthesis of quaternary ammonium salt

The synthesis of a quaternary ammonium salt having a branched aliphatic alkyl group was carried out in the following manner.

In a 2-l flask were charged 1,200 g of "Fine Oxochol 180N" [available from Nissan Chemical Industries, Ltd.; main component: 2-(3-methylhexyl)-7-methyl-1-decanol] and 6 g of a copper-nickel catalyst (0.5% by weight based on the weight of alcohol). The air in the system was replaced by nitrogen with stirring to initiate temperature rise. When the temperature of the system reached 100° C., hydrogen gas was then charged into the system at a flow rate of 20 l/hr. as determined by a flowmeter. The reaction system was then heated to 180° C., which is the reaction initiation temperature. At this temperature, methylamine gas was introduced into the reaction system in such an amount that the methylamine content in the exhaust gas reached about 5 vol-% to initiate reaction. The reaction was effected under normal pressure while the resulting water was being removed from the system for about 5 hours. After the termination of the reaction, the introduction of methylamine gas was suspended. Only hydrogen was introduced into the system for about 1 hour. Thereafter, the reaction system was allowed to cool to 100° C. in an atmosphere of nitrogen. The catalyst was then removed from the reaction system by filtration. The filtrate was then distilled off under a pressure of 5 torr to obtain a reaction product. The reaction product thus obtained was then subjected to gas chromatography. As a result, it was confirmed that a tertiary amine having two branched type aliphatic alkyl groups had been produced in a composition ratio of 99.7%.

Subsequently, into a 1 liter-autoclave were charged 300 g of the tertiary amine having two branched type aliphatic alkyl groups, 145 g of isopropyl alcohol and 35.4 g of methyl chloride. The reaction system was then heated to a temperature of 90° C. 16.1 g of a 48% aqueous solution of NaOH was continuously injected into the reaction system in about 2 hours. The reaction system was then subjected to ripening for about 6 hours. Thereafter, the reaction system was filtered to remove NaCl thus by-produced therefrom. The resulting reaction product was then analyzed. As a result, it was confirmed that a quaternary ammonium salt having two branched type aliphatic alkyl groups (described in the column of main component of organic modifier for Compound A in Table II-1) had been produced in an effective content (cation %) of 68%.

(b) Preparation of organically-modified layer silicate compound (Compound A)

Using the foregoing quaternary ammonium salt having two branched type aliphatic alkyl groups as an organic modifier, a layer silicate compound which had been organically modified in the following manner was synthesized.

To an aqueous solution comprising 10 g of montmorillonite (Kunipia F, available from Kunimine Industry Corp.) dispersed in 1 l of ion-exchanged water was added 300 g of an aqueous solution of 10.8 g of the foregoing quaternary ammonium salt having two branched type aliphatic alkyl groups having an effective content of 68% with stirring. The reaction system was then allowed to undergo reaction at a temperature of 60° C. for 2 hours. The resulting precipitate was thoroughly washed with ethanol and ion-exchanged water, filtered with suction, and then freeze-dried or spray-dried to obtain an organically-modified layer silicate compound (Compound A in Table II-1). The organically-modified layer silicate compound thus obtained was then measured for average spacing by an X-ray diffratometer (RU-200 (CuKα-40 kV), available from Rigaku Corp.). The result was 27.3 Å.

Compound A thus obtained was then added to liquid paraffin. The mixture was then stirred by means of a high speed dispersing machine (Homomixer MARK II2.5; 5,000 r.p.m., available from Tokushu Kika Kogyo Co., Ltd.). As a result, Compound A could be dispersed in liquid paraffin to give a (visually) transparent dispersion in an amount of up to 2% by weight. Using a rotary viscometer [Type B viscometer, available from Tokimec Inc.], the dispersion was then measured for apparent viscosity at 6 r.p.m. and 60 r.p.m. at 20° C. As a result, it was found that the present dispersion exhibits a sufficient thickening effect as well as thixotropic properties (Table I-2).

EXAMPLE II-2

The procedure of Example II-1 was followed to synthesize a tertiary amine having two branched type aliphatic alkyl groups in a composition ratio of 99.5% except that as an alcohol there was used "Dovanol 2345" (available from Mitsubishi Chemical Corporation; average molecular weight: 206).

The procedure of Example II-1 was followed to synthesize a quaternary ammonium salt having two branched type aliphatic alkyl groups having an effective content (cation %) of 67% (described in the column of organic modifier for Compound B in Table II-1) except that 46.5 g of methyl chloride and 17.7 g of a 48% aqueous solution of NaOH were used.

The procedure of Example II-1 was followed to synthesize an organically-modified layer silicate compound (Compound B in Table II-1) except that as an organic modifier there was used 8.5 g of the foregoing quaternary ammonium salt having two branched type aliphatic alkyl groups. The organically-modified layer silicate compound thus synthesized exhibited an average spacing of 2.56 nm.

Compound B thus obtained was then added to liquid paraffin. The mixture was then stirred by means of a high speed dispersing machine in the same manner as in Example II-1. As a result, Compound B could be dispersed in liquid paraffin to give a (visually) transparent dispersion in an amount of up to 2% by weight based on the weight of liquid paraffin. The dispersion was then measured for apparent viscosity in the same manner as in Example II-1. As a result, it was found that the dispersion exhibits a sufficient thickening effect as well as thixotropic properties (Table II-2).

EXAMPLE II-3

The procedure of Example II-1 was followed to synthesize a tertiary amine having one branched type aliphatic alkyl group in a composition ratio of 99.5% except that as an alcohol there was used "Kalcol 280G" (available from Kao Corp.; average molecular weight: 411) and a dimethylamine gas was used instead of a methylamine gas.

Subsequently the procedure of Example II-1 was followed to synthesize a quaternary ammonium salt having one branched type aliphatic alkyl group having an effective content (cation %) of 69% (described in the column of organic modifier for Compound C in Table II-1) except that 43.2 g of methyl chloride and 19.8 g of a 48% aqueous solution of NaOH were used.

The procedure of Example II-1 was followed to synthesize an organically-modified layer silicate compound (Compound C in Table II-1) except that as an organic modifier there was used 8.8 g of the foregoing quaternary ammonium salt having one branched type aliphatic alkyl group. The organically-modified layer silicate compound thus synthesized exhibited an average spacing of 2.89 nm.

Compound C thus obtained was then added to liquid paraffin. The mixture was then stirred by means of a high speed dispersing machine in the same manner as in Example II-1. As a result, Compound C could be dispersed in liquid paraffin to give a (visually) transparent dispersion in an amount of up to 2% by weight based on the weight of liquid paraffin. The dispersion was then measured for apparent viscosity in the same manner as in Example II-1. As a result, it was found that the dispersion exhibits a sufficient thickening effect as well as thixotropic properties (Table II-2).

EXAMPLE II-4

The procedure of Example II-3 was followed to synthesize an organically-modified layer silicate compound (Compound D in Table II-1) except that as the layer silicate there was used a swelling synthetic mica (ME-100, available from Coop Chemical Co., Ltd.) and as the organic modifier there was used the quaternary ammonium salt having one branched type aliphatic alkyl group (effective content: 69%) described in Example II-3. The organically-modified layer silicate compound thus synthesized exhibited an average interplanar spacing of 2.85 nm.

Compound D thus obtained was then added to liquid paraffin. The mixture was then stirred by means of a high speed dispersing machine in the same manner as in Example II-1. As a result, Compound D could be dispersed in liquid paraffin to give a (visually) transparent dispersion in an amount of up to 1% by weight based on the weight of liquid paraffin. The dispersion was then measured for apparent viscosity in the same manner as in Example II-1. As a result, it was found that the dispersion exhibits a sufficient thickening effect as well as thixotropic properties (Table II-2).

EXAMPLE II-5

(a) Synthesis of quaternary ammonium salt

The synthesis of a quaternary ammonium salt having a branched type aliphatic alkyl group was carried out in the following manner.

In a 2-l flask were charged 600 g of "Fine Oxochol 180N" and 12.0 g of a copper-nickel catalyst (2.0% by weight based on the weight of alcohol). The air in the system was replaced by nitrogen with stirring to initiate temperature rise. When the temperature of the system reached 100° C., hydrogen gas was then charged into the system at a flow rate of 40 l/hr. as determined by a flowmeter. The reaction system was then heated to 230° C., which is the reaction initiation temperature. At this temperature, 413 g of 1-dodecylamine (Farmin 20D, available from Kao Corp.) was introduced into the reaction system at once. The reaction system underwent reaction for about 5 hours. After the termination of the reaction, the catalyst was removed by filtration. The filtrate was then purified by distillation.

The resulting reaction product was then subjected to gas chromatography. As a result, it was confirmed that a secondary amine having a branched type aliphatic alkyl group had been produced in a composition ratio of 99.7%.

Subsequently, into an autoclave were charged 300 g of the secondary amine having a branched type aliphatic alkyl group, 145 g of isopropyl alcohol and 90.0 g of methyl chloride. The reaction system was then heated to a temperature of 90° C. 66.0 g of a 48% aqueous solution of NaOH was continuously injected into the reaction system in about 2 hours. The reaction system was then subjected to ripening for about 6 hours. Thereafter, the reaction system was filtered to remove NaCl thus by-produced therefrom. The resulting reaction product was then analyzed. As a result, it was confirmed that a quaternary ammonium salt having a branched type aliphatic alkyl group (described in the column of main component of organic modifier for Compound E in Table II-1) had been produced in an effective content (cation %) of 68%.

(b) Preparation of organically-modified layer silicate compound (Compound E)

Using the foregoing quaternary ammonium salt having a branched type aliphatic alkyl group as an organic modifier, a layer silicate compound which had been organically modified in the following manner was synthesized.

To an aqueous solution comprising 10 g of hectorite (SWN, available from Coop Chemical Co., Ltd.) dispersed in 1 l of ion-exchanged water was added 300 g of an aqueous solution of 8.6 g of the foregoing quaternary ammonium salt having a branched type aliphatic alkyl group having an effective content of 68% with stirring. The reaction system was then allowed to undergo reaction at a temperature of 60° C. for 2 hours. The resulting precipitate was thoroughly washed with ethanol and ion-exchanged water, filtered with suction, and then freeze-dried to obtain an organically-modified layer silicate compound (Compound E in Table II-1). The organically-modified layer silicate compound thus obtained was then measured for average interplanar spacing in the same manner as in Example II-1. The result was 2.51 nm.

Compound E thus obtained was then added to liquid paraffin. The mixture was then stirred by means of a high speed dispersing machine. As a result, Compound E could be dispersed in liquid paraffin to give a (visually) transparent dispersion in an amount of up to 2% by weight. The dispersion was then measured for apparent viscosity in the same manner as in Example II-1. As a result, it was found that the present dispersion exhibits a sufficient thickening effect as well as thixotropic properties (Table II-2).

EXAMPLE II-6

The specific volume resistivity of Compound A was measured. For the measurement of specific volume resistivity, Compound A which had been thoroughly dried in a vacuum desiccator comprising phosphorus pentaoxide provided therein was formed into compressed pellets having a diameter of 20 mm and a thickness of 1 mm which were then subjected to measurement in a dried glove compartment. The measurement of specific volume resistivity was carried out by means of a digital ultrahigh resistance/microammeter R8340A available from Advantest Corp. and an HRS probe available from Dia Instrument Inc. equipped with a shield overcoat of the inventors' own making. As a result, Compound A was found to have a specific volume resistivity of $6.7 \times 10^{10}$ Ω·cm (Table II-1).

Figure 2C:
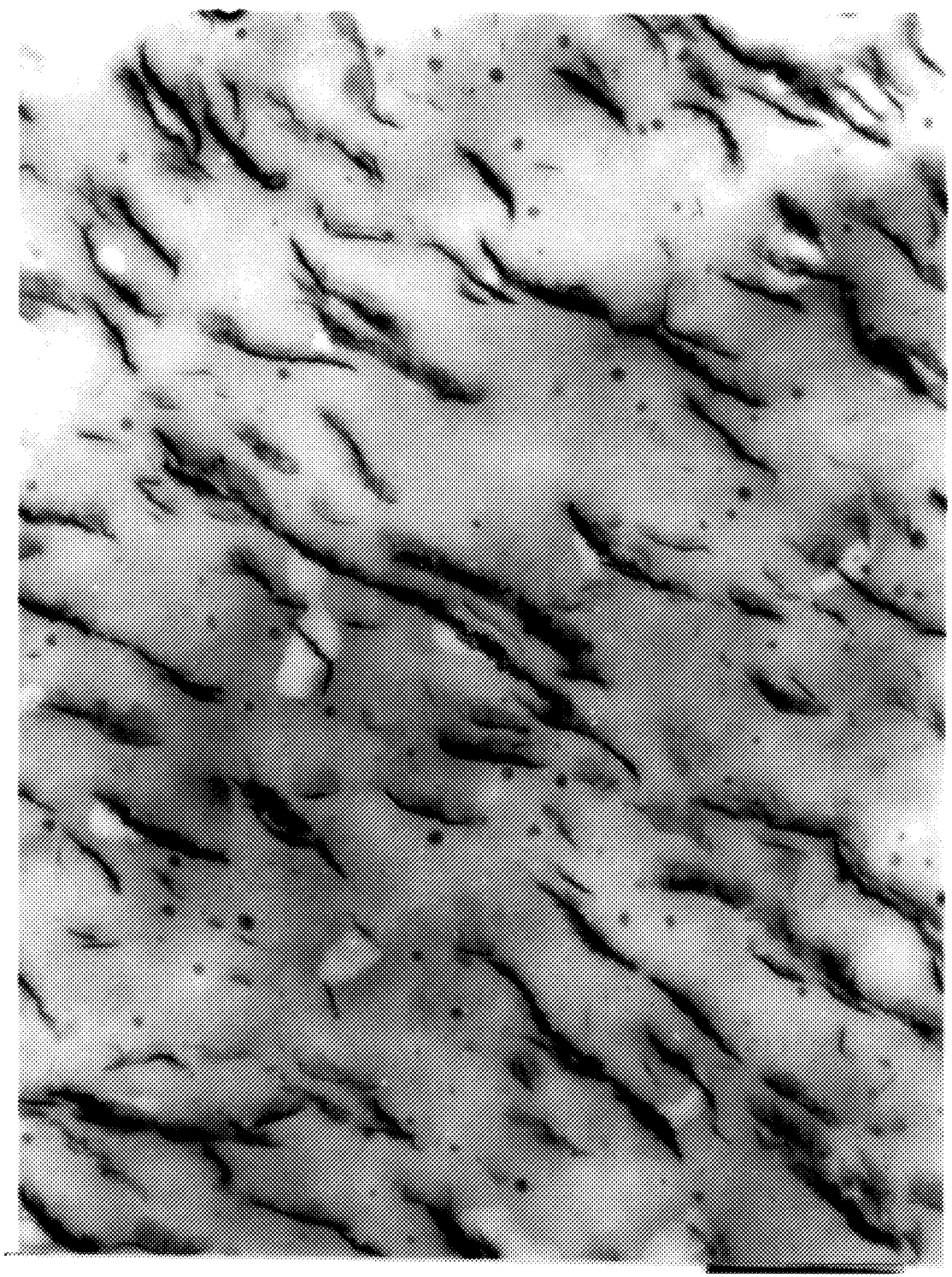
FIG. 2C is a transmission electron micrograph illustrating the particle structure of Compound A-polypropylene resin composition obtained in Example I-6.

Subsequently, 100 parts by weight of a polypropylene (PP) resin "F658H" available from Grand Polymer Co., Ltd. were melt-kneaded with 5 parts by weight of Compound A by means of a twin-screw extruder "PCM45-33.5" available from Ikegai Corp. (190° C., 100 r.p.m.). The mixture thus extruded was subjected to melt pressing to form 10 specimens (100 mm×100 mm×1 mm) which were then measured for various properties. The Compound A-polypropylene composite thus obtained exhibited the same transparency as the resin alone. When visually observed, it was confirmed that the organically-modified layer silicate particles had been dispersed so uniformly that no particles were recognized and a good transparency was attained. A TEM photograph of the specimen is shown in FIG. 2C. On TEM photograph, the majority of Compound A was present in the form of secondary aggregate having a short axis length of from 50 to 200 nm. The probability of occurrence of 2 or more organically-modified layer silicate particles in randomly extracted 200 numbers of 500 nm square divisions on TEM photograph was 87%. Compound A showed a good state of dispersion (method for evaluating the state of dispersion of organically-modified layer silicate particles will be described later).

The specimens were then measured for half-life period of charged voltage by means of Onestometer Type ES-5109 (available from Shishido Electrostat Ltd.). The result was 0.6 seconds, demonstrating that the specimens have antistatic properties. The specimens were washed with water/ethanol on the surface thereof, dried, and then measured for charged voltage half-life period again. The result was 0.5 seconds, demonstrating that the present resin composition has permanent antistatic properties (Table II-3). The present resin composite was measured for specific volume resistivity and specific surface resistivity before and after washed in the same manner as mentioned above. The results are shown in Table II-3.

The dispersibility of organically-modified layer silicate particles was evaluated in the following manner.

<Evaluation of dispersion of organically-modified layer silicate compound in resin>

Concerning an obviously homogeneous organically-modified layer silicate compound, only a primary aggregate or a secondary aggregate having a shortest diameter of not more than 500 nm are picked up from a plurality of 10,000 to 100,000 magnification transmission electron micrographs (TEM; image obtained from a 100-nm thick specimen) of the resin composition at 3 or more different positions. From the sum of the area on TEM image occupied by these organically-modified layer silicate particle phases, the total area on TEM image occupied by the resin matrix phase and the density (g/cm$^3$) of the two phases, it is judged if the proportion of the organically-modified layer silicate particles satisfying the requirement (1) for the degree of dispersion falls within the range of from 2 to 30 parts by weight based on 100 parts by weight of the resin used [Evaluation (A)]. On the other hand, from a plurality of 10,000 to 100,000 magnification TEM photographs, 200 numbers of 500 nm square divisions are randomly extracted. The probability of occurrence of different organically-modified layer silicate compound particles (primary aggregate particles in the case of independent primary aggregate; secondary aggregate is considered one particle in the case of secondary aggregate which forms a continuous phase) and/or two or more sections thereof in these divisions is then determined. A system in which this probability is not less than 50% is considered to meet the requirement (2) for the degree of dispersion [Evaluation (B); In practice, this evaluation includes the requirement (1) for the degree of dispersion or data concerning the amount of the organically-modified layer silicate compound and is often severer than the requirement (1) for the degree of dispersion]. Concerning a homogeneous organically-modified layer silicate compound-resin composite system, it is judged that if the resin composition system satisfies both the two evaluations (A) and (B), the organically-modified layer silicate compound is virtually dispersed in a proportion of from 2 to 30 parts by weight based on 100 parts by weight of the resin matrix in such an arrangement that both the two requirements (1) and (2) are met and the dispersion is good.

EXAMPLE II-7

100 parts by weight of a polyethylene (PE) resin "Sumikathene F208-1" available from Sumitomo Chemical Co., Ltd. were melt-kneaded with 30 parts by weight of Compound A in the same manner as in Example II-6. The Compound A-polyethylene composite thus obtained exhibited the same transparency as the resin alone. When visually observed, it was confirmed that the organically-modified layer silicate particles had been dispersed so uniformly that no particles were recognized and a good transparency was attained. The dispersion of Compound A in the resin was evaluated in the same manner as in Example II-6. As a result, it was confirmed that the dispersion of Compound A in the resin is good. The present resin composite was measured for half-life period of charged voltage. The result was not more than 0.2 seconds (Table II-3). The present resin composite was measured for specific volume resistivity and specific surface resistivity before and after washed in the same manner as in Example II-6. The results are shown in Table II-3.

EXAMPLE II-8

100 parts by weight of a polystyrene (PSt) resin "GP666" available from Asahi Chemical Industry Co., Ltd. were melt-kneaded with 5 parts by weight of Compound A in the same manner as in Example II-6 (200° C., 100 r.p.m.). The Compound A-polystyrene resin composite thus obtained exhibited the same transparency as the resin alone. When visually observed, it was confirmed that the organically-modified layer silicate particles had been dispersed so uniformly that no particles were recognized and a good transparency was attained. The dispersion of Compound A in the resin was evaluated in the same manner as in Example II-6. As a result, it was confirmed that the dispersion of Compound A in the resin is good. The present resin composite was measured for half-life period of charged voltage. The result was 2.1 seconds (Table II-3). The present resin composite was measured for specific volume resistivity and specific surface resistivity before and after washed in the same manner as in Example II-6. The results are shown in Table II-3.

EXAMPLE II-9

100 parts by weight of an acrylonitrile-butadienestyrene (ABS resin) "Toyolac #100" available from Toray Industries, Inc. were melt-kneaded with 5 parts by weight of Compound A in the same manner as in Example II-6 (220° C., 100 r.p.m.). When the Compound A-ABS resin composite thus obtained was visually observed, it was confirmed that the organically-modified layer silicate particles had been dispersed so uniformly that no particles were recognized. The dispersion of Compound A in the resin was evaluated in the same manner as in Example II-6. As a result, it was confirmed that the dispersion of Compound A in the resin is good. The present resin composite was measured for half-life period of charged voltage. The result was 1.6 seconds (Table II-3). The present resin composite was measured for specific volume resistivity and specific surface resistivity before and after washed in the same manner as in Example II-6. The results are shown in Table II-3.

EXAMPLE II-10

The specific volume resistivity of Compound B was measured in the same manner as in Example II-6. The result was $9.0 \times 10^{11}$ $\Omega \cdot$cm (Table II-1). Subsequently the procedure of Example II-6 was followed to obtain a Compound B-polypropylene resin composite except that Compound B was used instead of Compound A. The Compound B-polypropylene resin composite thus obtained exhibited the same transparency as the resin alone. When visually observed, it was confirmed that the organically-modified layer silicate particles had been dispersed so uniformly that no particles were recognized and a good transparency was attained. The dispersion of Compound B in the resin was evaluated in the same manner as in Example II-6. As a result, it was confirmed that the dispersion of Compound B in the resin is good. The present resin composite was measured for half-life period of charged voltage. The result was 0.5 seconds (Table II-3). The present resin composite was measured for specific volume resistivity and specific surface resistivity before and after washed in the same manner as in Example II-6. The results are shown in Table II-3.

EXAMPLE II-11

The specific volume resistivity of Compound C was measured in the same manner as in Example II-6. The result was $8.4 \times 10^{10}$ $\Omega \cdot$cm (Table II-1). The procedure of Example II-6 was followed to obtain a Compound C-polypropylene resin composite except that Compound C was used instead of Compound A. The Compound C-polypropylene resin composite thus obtained exhibited the same transparency as the resin alone. When visually observed, it was confirmed that the organically-modified layer silicate particles had been dispersed so uniformly that no particles were recognized and a good transparency was attained. The dispersion of Compound C in the resin was evaluated in the same manner as in Example II-6. As a result, it was confirmed that the dispersion of Compound C in the resin is good. The present resin composite was measured for half-life period of charged voltage. The result was 0.5 seconds (Table II-3). The present resin composite was measured for specific volume resistivity and specific surface resistivity before and after washed in the same manner as in Example II-6. The results are shown in Table II-3.

EXAMPLE II-12

The specific volume resistivity of Compound D was measured in the same manner as in Example II-6. The result was $7.5 \times 10^{11}$ $\Omega \cdot$cm (Table II-1). The procedure of Example II-6 was followed to obtain a Compound D-polypropylene resin composite except that Compound D was used instead of Compound A. The Compound D-polypropylene resin composite thus obtained exhibited the same transparency as the resin alone. When visually observed, it was confirmed that the organically-modified layer silicate particles had been dispersed so uniformly that no particles were recognized and a good transparency was attained. The dispersion of Compound D in the resin was evaluated in the same manner as in Example II-6. As a result, it was confirmed that the dispersion of Compound D in the resin is good. The present resin composite was measured for half-life period of charged voltage. The result was 1.3 seconds (Table II-3). The present resin composite was measured for specific volume resistivity and specific surface resistivity before and after washed in the same manner as in Example II-6. The results are shown in Table II-3.

EXAMPLE II-13

The specific volume resistivity of Compound E was measured in the same manner as in Example II-6. The result was $5.7 \times 10^{11}$ $\Omega \cdot$cm (Table II-1). The procedure of Example II-6 was followed to obtain a Compound E-polypropylene resin composite except that Compound E was used instead of Compound A. The Compound E-polypropylene resin composite thus obtained exhibited the same transparency as the resin alone. When visually observed, it was confirmed that the organically-modified layer silicate particles had been dispersed so uniformly that no particles were recognized and a good transparency was attained. The dispersion of Compound E in the resin was evaluated in the same manner as in Example II-6. As a result, it was confirmed that the dispersion of Compound E in the resin is good. The present resin composite was measured for half-life period of charged voltage. The result was 2.2 seconds (Table II-3).

EXAMPLE II-14

(a) Synthesis of quaternary ammonium salt

In a 2-l flask were charged 200 g of "Dovanol 2345" (available from Mitsubishi Chemical Corporation; average molecular weight: 206) and 4.0 g of a copper-nickel catalyst (2.0% by weight based on the weight of alcohol). The air in the system was replaced by nitrogen with stirring to initiate temperature rise. When the temperature of the system reached 100° C., hydrogen gas was then charged into the system at a flow rate of 40 l/hr. as determined by a flowmeter. The reaction system was then heated to 250° C., which is the reaction initiation temperature. At this temperature, 1,011 g of distearylamine ("Farmin D86", available from Kao Corp.) was introduced into the reaction system at once. The reaction system underwent reaction for about 7 hours. After the termination of the reaction, the catalyst was removed by filtration. The filtrate was then purified. The resulting reaction product was then subjected to gas chromatography. As a result, it was confirmed that a tertiary amine having a branched type aliphatic alkyl group had been produced in a composition ratio of 95.4%.

Subsequently, into a 1-l autoclave were charged 350 g of the tertiary amine having a branched type aliphatic alkyl group, 170 g of isopropyl alcohol and 125 g of methyl chloride. The reaction system was then heated to a temperature of 90° C. 82.5 g of a 48% aqueous solution of NaOH was continuously injected into the reaction system in about 2 hours. The reaction system was then subjected to ripening for about 6 hours. Thereafter, the reaction system was filtered to remove NaCl thus by-produced therefrom. The resulting reaction product was then analyzed. As a result, it was confirmed that a quaternary ammonium salt having a branched type aliphatic alkyl group (described in the column of organic modifier for Compound I in Table II-1) had been produced in an effective content (cation %) of 68%.

(b) Preparation of organically-modified layer silicate compound (Compound I)

The procedure of Example II-1 was followed to synthesize an organically-modified layer silicate compound (Compound I in Table II-1) except that as the organic modifier there was used 14.1 g of the foregoing quaternary ammonium salt having a branched type aliphatic alkyl group. The organically-modified layer silicate compound thus obtained exhibited an average interplanar spacing of 2.65 nm.

Compound I thus obtained was then added to liquid paraffin. The mixture was then stirred by means of a high speed dispersing machine. As a result, Compound I could be dispersed in liquid paraffin to give a (visually) transparent dispersion in an amount of up to 2% by weight. The dispersion was then measured for apparent viscosity in the same manner as in Example II-1. As a result, it was found that the present dispersion exhibits a sufficient thickening effect as well as thixotropic properties (Table II-2).

The specific volume resistivity of Compound I was measured in the same manner as in Example II-6. The result was $7.6 \times 10^{10}$ Ω·cm (Table II-1). The procedure of Example II-6 was followed to obtain a Compound I-polypropylene resin composite except that Compound I was used instead of Compound A. The Compound I-polypropylene resin composite thus obtained exhibited the same transparency as the resin alone. When visually observed, it was confirmed that the organically-modified layer silicate particles had been dispersed so uniformly that no particles were recognized and a good transparency was attained. The dispersion of Compound I in the resin was evaluated in the same manner as in Example II-6. As a result, it was confirmed that the dispersion of Compound E in the resin is good. The present resin composite was measured for half-life period of charged voltage. The result was 2.9 seconds (Table II-3). The present resin composite was measured for specific volume resistivity and specific surface resistivity before and after washed in the same manner as in Example II-6. The results are shown in Table II-3.

EXAMPLE II-15

The procedure of Example II-1 was followed to synthesize a tertiary amine having one branched type aliphatic alkyl group in a composition ratio of 99.3% except that dimethylamine gas was used instead of methylamine gas.

Subsequently, the procedure of Example II-2 was followed to synthesize a quaternary ammonium salt having one branched type aliphatic alkyl group having an effective content (cation %) of 71% (described in the column of organic modifier for Compound J in Table II-2) except that 40.6 g of methyl chloride and 18.6 g of a 48% aqueous solution of NaOH were used.

The procedure of Example II-1 was followed to synthesize an organically-modified layer silicate compound (Compound J in Table II-1) except that as the organic modifier there was used 6.8 g of the foregoing quaternary ammonium salt having a branched type aliphatic alkyl group. The organically-modified layer silicate compound thus obtained exhibited an average interplanar spacing of 2.45 nm.

Compound J thus obtained was then added to liquid paraffin. The mixture was then stirred by means of a high speed dispersing machine. As a result, Compound J could be dispersed in liquid paraffin to give a (visually) transparent dispersion in an amount of up to 2% by weight. The dispersion was then measured for apparent viscosity in the same manner as in Example II-1. As a result, it was found that the present dispersion exhibits a sufficient thickening effect as well as thixotropic properties (Table II-2).

The specific volume resistivity of Compound J was measured in the same manner as in Example II-6. The result was $8.8 \times 10^{11}$ Ω·cm (Table II-1). The procedure of Example II-6 was followed to obtain a Compound J-polypropylene resin composite except that Compound J was used instead of Compound A. The Compound J-polypropylene resin composite thus obtained exhibited the same transparency as the resin alone. When visually observed, it was confirmed that the organically-modified layer silicate particles had been dispersed so uniformly that no particles were recognized and a good transparency was attained. The dispersion of Compound J in the resin was evaluated in the same manner as in Example II-6. As a result, it was confirmed that the dispersion of Compound J in the resin is good. The present resin composite was measured for half-life period of charged voltage. The result was 4.2 seconds (Table II-3). The present resin composite was measured for specific volume resistivity and specific surface resistivity before and after washed in the same manner as in Example II-6. The results are shown in Table II-3.

COMPARATIVE EXAMPLE II-1

The procedure of Example II-1 was followed to synthesize an organically-modified layer silicate compound (Compound F in Table II-1) except that as the organic modifier there was used 5.1 g of n-octadecyltrimethyl ammonium chloride (Quartamin 86P; effective content: 85%; available from Kao Corp.). The organically-modified layer silicate compound thus synthesized exhibited an average interplanar spacing of 2.13 nm.

Compound F thus obtained was then added to liquid paraffin. The mixture was then stirred by means of a high speed dispersing machine in the same manner as in Example II-1. As a result, Compound F showed a visual sign of swelling but didn't undergo dispersion. After the suspension of stirring, Compound F was immediately precipitated. Further, a 1% mixture of Compound F couldn't exert a sufficient thickening effect (Table II-2).

COMPARATIVE EXAMPLE II-2

The procedure of Example II-1 was followed to synthesize an organically-modified layer silicate compound (Compound G in Table II-1) except that as the organic modifier there was used 7.4 g of di-n-octadecyldimethyl ammonium chloride (Quartamin D86P; effective content: 85%; available from Kao Corp.). The organically-modified layer silicate compound thus synthesized exhibited an average interplanar spacing of 2.81 nm.

Compound G thus obtained was then added to liquid paraffin. The mixture was then stirred by means of a high speed dispersing machine in the same manner as in Example II-1. As a result, Compound G showed a visual sign of swelling but didn't undergo dispersion. After the suspension of stirring, Compound G was immediately precipitated. Further, a 1% mixture of Compound G couldn't exert a sufficient thickening effect and exhibit thixotropic properties (Table II-2).

COMPARATIVE EXAMPLE II-3

In a 2-l flask were charged 1,200 g of n-stearyl alcohol "Kalcol 8098, available from Kao Corp.) and 6 g of a copper-nickel catalyst (0.5% by weight based on the weight of alcohol). The air in the system was replaced by nitrogen with stirring to initiate temperature rise. When the temperature of the system reached 100° C., hydrogen gas was then charged into the system at a flow rate of 20 l/hr. as determined by a flowmeter. The reaction system was then heated to 180° C., which is the reaction initiation temperature. At this temperature, methylamine gas was introduced into the reaction system in such an amount that the methylamine content in the exhaust gas reached about 5 vol-% to initiate reaction. The reaction was effected under normal pressure. When the conversion rate of alcohol reached 95%, the introduction of methylamine gas was suspended. Only hydrogen was then introduced into the system for about 1 hour. Thereafter, the reaction system was allowed to cool to 100° C. in an atmosphere of nitrogen. The catalyst was then removed from the reaction system by filtration. The filtrate was then purified by distillation under a pressure of 5 torr to obtain a reaction product. The reaction product thus obtained was then analyzed. As a result, it was confirmed that di-n-octadecylmethylamine had been produced in a composition ratio of 99.7%.

Subsequently, into a 2-l four-neck flask were charged 300 g of di-n-octadecylmethylamine and 480 g of ion-exchanged water. The reaction system was then heated to a temperature of 55° C. 73.1 g of benzyl chloride was then added dropwise to the reaction system. The reaction mixture was then subjected to ripening for 6 hours. Thereafter, to the reaction system was then added 1.6 g of a 48% aqueous solution of NaOH. The reaction system was filtered to remove NaCl thus by-produced therefrom to obtain a reaction product. The reaction product was then analyzed. As a result, it was confirmed that a quaternary ammonium salt having two straight-chain alkyl groups and benzyl groups (described in the column of main component of organic modifier for Compound H in Table II-1) had been produced in an effective content (cation %) of 42%.

The procedure of Example II-1 was followed to synthesize an organically-modified layer silicate compound (Compound H in Table II-1) except that as the organic modifier there was used 18.2 g of the foregoing quaternary ammonium salt having two straight-chain alkyl groups and benzyl groups. The organically-modified layer silicate compound thus synthesized exhibited an average interplanar spacing of 2.49 nm.

Compound H thus obtained was then added to liquid paraffin. The mixture was then stirred by means of a high speed dispersing machine in the same manner as in Example II-1. As a result, Compound H showed a visual sign of swelling but didn't undergo dispersion. After the suspension of stirring, Compound H was immediately precipitated. Further, a 1% mixture of Compound H couldn't exert a sufficient thickening effect and exhibit thixotropic properties (Table II-2).

COMPARATIVE EXAMPLE II-4

The specific volume resistivity of Compound F was measured in the same manner as in Example II-6. The result was 8.9×10$^{11}$ Ω·cm (Table II-1). Subsequently, the procedure of Example II-6 was followed to obtain a Compound F-polypropylene resin composite except that Compound F was used instead of Compound A. The Compound F-polypropylene resin composite thus obtained was clearly observed by naked eyes to have organically-modified layer silicate particles and thus looked cloudy. When subjected to TEM analysis, the majority of Compound F was observed unevenly distributed in the resin matrix in the Compound F-polypropylene resin composite in the form of secondary aggregate having a short axis length of from 1 μm to 100 and scores of micrometer. The probability of occurrence of 2 or more organically-modified layer silicate particles in randomly extracted 200 numbers of 500 nm square divisions was only 15%. The present resin composite was measured for charged voltage half-life period. The result was not less than 30 seconds, demonstrating that it has no antistatic properties (Table II-3). The present resin composite was measured for specific volume resistivity and specific surface resistivity before and after washed in the same manner as in Example II-6. The results are shown in Table II-3.

COMPARATIVE EXAMPLE II-5

The specific volume resistivity of Compound G was measured in the same manner as in Example II-6. The result was 4.5×10$^{11}$ Ω·cm (Table II-1). Subsequently, the procedure of Example II-6 was followed to obtain a Compound G-polypropylene resin composite except that Compound G was used instead of Compound A. The Compound G-polypropylene resin composite thus obtained was clearly observed by naked eyes to have organically-modified layer silicate particles and thus looked cloudy. The present resin composite was measured for charged voltage half-life period. The result was not less than 30 seconds, demonstrating that it has no antistatic properties (Table II-3). The present resin composite was measured for specific volume resistivity and specific surface resistivity before and after washed in the same manner as in Example II-6. The results are set forth in Table II-3.

COMPARATIVE EXAMPLE II-6

The specific volume resistivity of Compound H was measured in the same manner as in Example II-6. The result was 7.9×10$^{12}$ Ω·cm (Table II-1). Subsequently, the procedure of Example II-6 was followed to obtain a Compound H-polypropylene resin composition except that Compound H was used instead of Compound A. The Compound H-polypropylene resin composite thus obtained was clearly observed by naked eyes to have organically-modified layer silicate particles and thus looked cloudy. The present resin composite was measured for charged voltage half-life period. The result was not less than 30 seconds, demonstrating that it has no antistatic properties (Table II-3). The present resin composite was measured for specific volume resistivity and specific surface resistivity before and after washed in the same manner as in Example II-6. The results are shown in Table II-3.

COMPARATIVE EXAMPLES II-7 TO II-10

The procedure of Examples II-6 to II-9 were followed to melt-knead the resins used in these examples except that no organically-modified layer silicates were added. These resins were then subjected to melt-press molding in the same manner as in these examples. The resins were each measured for charged voltage half-life period. However, these four kinds of resins exhibited a charged voltage half-life period of not less than 30 seconds, demonstrating that they have no antistatic properties (Table II-3). These specimens were each measured for specific volume resistivity and specific surface resistivity before and after washed in the same manner as in Example II-6. The results are shown in Table II-3.

TABLE II-1

| Compound | Organic modifier (main component) | Layer silicate | Spacing* (nm) | Specific volume resistivity ($\Omega \cdot cm$) |
|---|---|---|---|---|
| A | $(C_3H_7CHC_4H_8)(C_3H_7CHC_2H_4)CHCH_2-\overset{\oplus}{N}(CH_3)_2-CH_2CH(C_4H_8CHC_3H_7)(C_2H_4CHC_3H_7)$ $Cl^{\ominus}$ (with CH$_3$ branches) | Montmorillonite (Kunipia F) | 2.73 | $6.7 \times 10^{10}$ |
| B | $C_9H_{19}CHCH_2-\overset{\oplus}{N}(CH_3)_3-CH_2CHC_9H_{19}$ (CH$_3$ branches) $Cl^{\ominus}$ | Montmorillonite (Kunipia F) | 2.56 | $9.0 \times 10^{11}$ |
| C | $(C_{14}H_{29})(C_{12}H_{25})CHCH_2-\overset{\oplus}{N}(CH_3)_3$ $Cl^{\ominus}$ | Montmorillonite (Kunipia F) | 2.89 | $8.4 \times 10^{10}$ |
| D | $(C_{14}H_{29})(C_{12}H_{25})CHCH_2-\overset{\oplus}{N}(CH_3)_3$ $Cl^{\ominus}$ | Synthetic mica (ME-100) | 2.85 | $7.5 \times 10^{10}$ |
| E | $(C_3H_7CHC_4H_8)(C_3H_7CHC_2H_4)CHCH_2-\overset{\oplus}{N}(CH_3)_2-C_{12}H_{25}$ (CH$_3$ branches) $Cl^{\ominus}$ | Hectorite (SWN) | 2.51 | $5.7 \times 10^{10}$ |
| F | $C_{18}H_{37}-\overset{\oplus}{N}(CH_3)_3$ $Cl^{\ominus}$ | Montmorillonite (Kunipia F) | 2.13 | $8.9 \times 10^{11}$ |
| G | $C_{18}H_{37}-\overset{\oplus}{N}(CH_3)_2-C_{18}H_{37}$ $Cl^{\ominus}$ | Montmorillonite (Kunipia F) | 2.81 | $4.5 \times 10^{11}$ |
| H | $C_{18}H_{37}-\overset{\oplus}{N}(CH_3)_2-CH_2-C_6H_5$ $Cl^{\ominus}$ | Hectorite (SWN) | 2.49 | $7.9 \times 10^{12}$ |
| I | $(C_{18}H_{37})_2\overset{\oplus}{N}(CH_3)-CH_2-CH(CH_3)-C_9H_{19}$ $Cl^{\ominus}$ | Montmorillonite (Kunipia F) | 2.65 | $7.6 \times 10^{10}$ |
| J | $(C_3H_7CHC_4H_8)(C_3H_7CHC_2H_4)CHCH_2-\overset{\oplus}{N}(CH_3)_3$ (CH$_3$ branches) $Cl^{\ominus}$ | Montmorillonite (Kunipia F) | 2.45 | $8.8 \times 10^{10}$ |

*Spacing means interplanar spacing.

TABLE II-2

| Example No. | Compound | Dispersibility in liquid paraffin | Apparent viscosity of liquid paraffin dispersion (mPa.S) | |
|---|---|---|---|---|
| | | | 6 r.p.m. | 60 r.p.m. |
| Example 1 | A | G | 4,800 | 1,600 |
| Example 2 | B | G | 3,700 | 1,200 |
| Example 3 | C | G | 3,800 | 1,000 |
| Example 4 | D | G | 2,200 | 800 |
| Example 5 | E | G | 4,000 | 1,100 |
| Example 14 | I | G | 4,300 | 1,300 |
| Example 15 | J | G | 3,100 | 1,000 |
| Comparative Example 1 | F | P | 310 | 280 |
| Comparative Example 2 | G | P | 360 | 340 |
| Comparative Example 3 | H | P | 380 | 380 |
| Liquid paraffin | — | — | 170 | 150 |

TABLE II-3

| | | Compound | | | Specific volume resistivity | Specific surface resistivity | Charged voltage half-life period |
|---|---|---|---|---|---|---|---|
| Example No. | Resin | Kind | Addition amount (pts.)* | Dispersibility in resin | ($\Omega \cdot cm$) Before/After washing | ($\Omega/cm^2$) Before/After washing | (sec.) Before/After washing |
| Example 6 | PP | A | 5 | G | $7.3 \times 10^{11}/2.9 \times 10^2$ | $1.2 \times 10^{13}/8.1 \times 10^{13}$ | 0.6/0.5 |
| Example 7 | PE | A | 30 | G | $7.7 \times 10^{11}/4.9 \times 10^{12}$ | $1.8 \times 10^{13}/8.8 \times 10^{13}$ | $\leq 0.2/\leq 0.2$ |
| Example 8 | PSt | A | 5 | G | $5.0 \times 10^{11}/3.8 \times 10^{12}$ | $1.2 \times 10^{13}/3.9 \times 10^{13}$ | 2.1/2.8 |
| Example 9 | ABS | A | 5 | G | $6.4 \times 10^{11}/5.6 \times 10^{12}$ | $4.5 \times 10^{13}/5.6 \times 10^{13}$ | 1.6/1.3 |
| Example 10 | PP | B | 5 | G | $1.8 \times 10^{12}/5.4 \times 10^{12}$ | $8.7 \times 10^{13}/2.3 \times 10^{14}$ | 0.5/0.5 |
| Example 11 | PP | C | 5 | G | $5.0 \times 10^{11}/7.1 \times 10^{11}$ | $2.1 \times 10^{13}/7.3 \times 10^{13}$ | 0.5/1.2 |
| Example 12 | PP | D | 5 | G | $1.0 \times 10^{12}/4.8 \times 10^{12}$ | $8.7 \times 10^{13}/4.1 \times 10^{14}$ | 1.3/1.3 |
| Example 13 | PE | E | 5 | G | $7.0 \times 10^{11}/7.7 \times 10^{11}$ | $2.8 \times 10^{13}/7.8 \times 10^{13}$ | 2.2/3.1 |
| Example 14 | PP | I | 5 | G | $4.7 \times 10^{11}/5.0 \times 10^{11}$ | $3.4 \times 10^{13}/4.1 \times 10^{13}$ | 2.9/2.1 |
| Example 15 | PP | J | 5 | G | $8.8 \times 10^{11}/2.7 \times 10^{12}$ | $8.3 \times 10^{13}/5.9 \times 10^{13}$ | 4.2/3.5 |
| Comparative Example 4 | PP | F | 5 | P | $6.8 \times 10^{14}/4.8 \times 10^{14}$ | $5.2 \times 10^{14}/8.6 \times 10^{14}$ | $\geq 30/\geq 30$ |
| Comparative Example 5 | G | G | 5 | P | $9.8 \times 10^{13}/2.3 \times 10^{14}$ | $1.7 \times 10^{15}/6.7 \times 10^{15}$ | $\geq 30/\geq 30$ |
| Comparative Example 6 | PE | H | 5 | P | $5.9 \times 10^{14}/7.4 \times 10^{14}$ | $3.5 \times 10^{15}/8.9 \times 10^{15}$ | $\geq 30/\geq 30$ |
| Comparative Example 7 | PP | — | — | — | $\geq 1.0 \times 10^{16}$ | $\geq 1.0 \times 10^{16}$ | $\geq 30/\geq 30$ |
| Comparative Example 8 | PE | — | — | — | $\geq 1.0 \times 10^{15}$ | $\geq 1.0 \times 10^{16}$ | $\geq 30/\geq 30$ |
| Comparative Example 9 | PSt | — | — | — | $\geq 1.0 \times 10^{16}$ | $\geq 1.0 \times 10^{16}$ | $\geq 30/\geq 30$ |
| Comparative Example 10 | ABS | — | — | — | $\geq 1.0 \times 10^{16}$ | $\geq 1.0 \times 10^{16}$ | $\geq 30/\geq 30$ |

In Table II-3, the amount of compounds added is represented by the part (by weight) based on 100 parts by weight of the resin.

While the invention has been described in detail and with reference to specific embodiments thereof, it will be apparent to one skilled in the art that various changes and modifications can be made therein without departing from the spirit and scope thereof.

What is claimed is:

1. A resin composition, comprising an organically-modified layer silicate compound which is a reaction product of a layer silicate with an organic ammonium salt having a specific volume resistivity of not more than $1 \times 10^{13}$ $\Omega \cdot cm$ dispersed in a synthetic resin in a proportion of from 2 to 30 parts by weight based on 100 parts by weight of said synthetic resin in the state that (1) a primary aggregate and/or a secondary aggregate having a short axis length of not more than 500 nm is formed and (2) the average minimum interparticle distance is not more than 500 nm.

2. A process for the antistatic treatment of a resin, which comprises dispersing an organically-modified layer silicate compound which is a reaction product of a layer silicate with an organic ammonium salt having a specific volume resistivity of not more than $1 \times 10^{13}$ $\Omega \cdot cm$ in a synthetic resin in a proportion of from 2 to 30 parts by weight based on 100 parts by weight of said synthetic resin in a state that (1) a primary aggregate and/or a secondary aggregate having a short axis length of not more than 500 nm is formed and (2) the average minimum interparticle distance is not more than 500 nm.

3. The resin composition as in claim 1, wherein said organic ammonium salt is represented by formula (I):

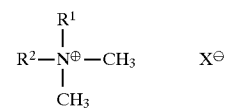

wherein $R^1$ and $R^2$ may be the same or different and each represent an alkyl group having 12 or more carbon atoms which may have substituents; and $X^\ominus$ represents a counter ion.

4. The resin composition as in claim 1, wherein said organic ammonium salt is represented by formula (II):

wherein $R^3$ and $R^4$ may be the same or different and each represent an alkyl group having 12 or more carbon atoms which may have substituents; $R^5$ represents a hydrogen atom or $C_{2-7}$ alkyl or aryl group which may have substituents; $R^6$ represents a hydrogen atom or $C_{1-7}$ alkyl or aryl group which may have substituents; and $X^\ominus$ represents a counter ion.

5. The resin composition as in claim 1, wherein said organic ammonium salt is represented by formula (III):

wherein $R^7$, $R^8$ and $R^9$ may be the same or different and each represent an alkyl group having 8 or more carbon atoms which may have substituents; $R^{10}$ represents a hydrogen atom or alkyl or aryl group having one or more carbon atoms which may have substituents; and $X^\ominus$ represents a counter ion.

6. The resin composition as in claim 1, wherein said organic ammonium salt is represented by formula (IV):

wherein $R^{11}$ represents an alkyl group having 8 or more carbon atoms which may have substituents; $R^{12}$ represents a $C_{1-11}$ alkyl group which may have substituents; $R^{13}$ and $R^{14}$ may be the same or different and each represent a $C_{1-7}$ alkyl group which may have substituents; and $X^\ominus$ represents a counter ion.

7. The resin composition as in claim 1, wherein said organic ammonium salt is represented by formula (V):

wherein $R^{15}$ represents a mono- or polyoxyalkylene group comprising a $C_{2-4}$ oxyalkylene unit; $R^{16}$ and $R^{17}$ may be the same or different and each represent at least one substituent selected from the group consisting of $C_{1-30}$ alkyl group which may have substituents and mono- or polyoxyalkylene group comprising a $C_{2-4}$ oxyalkylene unit, with the proviso that the addition mole number of oxyalkylene unit is from 1 to 50; $R^{18}$ represents a hydrogen atom or $C_{1-8}$ alkyl or aryl group which may have substituents; and $X^\ominus$ represents a counter ion.

8. The resin composition as in claim 1, wherein said organic ammonium salt is represented by formula (VI):

wherein $R^{19}$ represents an alkylmono- or polyoxyalkylene group comprising an alkyl unit having one or more carbon atoms which may have substituents and a $C_{2-4}$ oxyalkylene unit which may have substituents, phenylmono- or polyoxyoxyalkylene group having a $C_{2-4}$ oxyalkylene unit, alkylphenylmono- or polyoxyalkylene group comprising an alkyl unit having one or more carbon atoms which may have substituents and a $C_{2-4}$ oxyalkylene unit, or acylmono- or polyoxyalkylene group comprising an acyl unit having 2 or more carbon atoms which may have substituents and a $C_{2-4}$ oxyalkylene unit; $R^{20}$ and $R^{21}$ may be the same or different and each represent at least one substituent selected from the group consisting of $C_{1-30}$ alkyl group which may have substituents, mono- or polyoxyalkylene group comprising a $C_{2-4}$ oxyalkylene unit, alkylmono- or polyoxyalkylene group comprising an alkyl unit having one or more carbon atoms which may have substituents and a $C_{2-4}$ oxyalkylene unit which may have substituents, phenylmono- or polyoxyalkylene group having a $C_{2-4}$ oxyalkylene unit, alkylphenylmono- or polyoxyalkylene group comprising an alkyl unit having one or more carbon atoms which may have substituents and a $C_{2-4}$ oxyalkylene unit, and acylmono- or polyoxyalkylene group comprising an acyl unit having 2 or more carbon atoms which may have substituents and a $C_{2-4}$ oxyalkylene unit, with the proviso that the addition mole number of oxyalkylene unit is from 1 to 50; $R^{22}$ represents a hydrogen atom or $C_{1-8}$ alkyl or aryl group which may have substituents; and $X^\ominus$ represents a counter ion.

9. The resin composition as in claim 1, wherein said organic ammonium salt is represented by formula (VII):

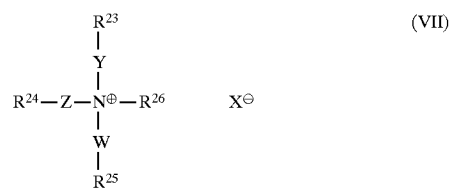

wherein $R^{23}$, $R^{24}$ and $R^{25}$ may be the same or different and each represent at least one substituent selected from the group consisting of $C_{1-30}$ alkyl group which may have substituents, mono- or polyoxyalkylene group comprising a $C_{2-4}$ oxyalkylene unit, alkylmono- or polyoxyalkylene group comprising an alkyl unit having one or more carbon atoms which may have substituents and a $C_{2-4}$ oxyalkylene unit which may have substituents, phenylmono- or polyoxyalkylene group having a $C_{2-4}$ oxyalkylene unit, alkylphenylmono- or polyoxyalkylene group comprising an alkyl unit having one or more carbon atoms which may have substituents and a $C_{2-4}$ oxyalkylene unit, and acylmono- or polyoxyalkylene group comprising an acyl unit having 2 or more carbon atoms which may have substituents and a $C_{2-4}$ oxyalkylene unit; $R^{26}$ represents a hydrogen atom or $C_{1-8}$ alkyl or aryl group which may have substituents, with the proviso that the addition mole number of oxyalkylene unit is from 1 to 50; at least one of Y, Z and W represents at least one connecting group selected from the group consisting of —$CH_2O$—, —$CH_2COO$—, —$CH_2CH_2COO$—, —$CH_2OCO$—, —$CH_2CH_2OCO$—, —$(CH_2)_mNHCO$— and —$(CH_2)_mNHCO$—$CH_2O$— and the others each represent a direct bond to the nitrogen atom in the ammonium group; m represents an integer of from 1 to 4; and $X^\ominus$ represents a counter ion.

10. The resin composition as in claim 1, wherein said organic ammonium salt is represented by formula (VIII):

wherein $R^{101}$ represents a branched saturated aliphatic alkyl group having 24 or more carbon atoms and containing a side chain alkyl group having 8 or more carbon atoms; and $X^\ominus$ represents a counter ion.

11. The resin composition as in claim 1, wherein said organic ammonium salt is represented by formula (IX):

(IX)

wherein $R^{102}$ and $R^{103}$ each represent a saturated aliphatic alkyl group having 12 or more carbon atoms, with the proviso that at least one of $R^{102}$ and $R^{103}$ represents a branched saturated aliphatic alkyl group having one or more side chain alkyl groups having one or more carbon atoms; and $X^\ominus$ represents a counter ion.

12. The resin composition as in to claim 1, wherein said organic ammonium salt is represented by formula (X):

(X)

wherein $R^{201}$ represents a branched saturated aliphatic alkyl group having 8 or more carbon atoms containing at least one alkyl group having one or more carbon atoms in its side chain; $R^{202}$, $R^{203}$ and $R^{204}$ may be the same or different and each represent a hydrogen atom or $C_{1-2}$ alkyl group; and $X^\ominus$ represents a counter ion.

13. The resin composition as in claim 1, wherein said organic ammonium salt is represented by formula (XI):

(XI)

wherein $R^{205}$ and $R^{206}$ each represent a saturated aliphatic alkyl group having 8 or more carbon atoms, with the proviso that at least one of $R^{205}$ and $R^{206}$ represents a branched aliphatic alkyl group containing at least one alkyl group having one or more carbon atoms in its side chain; $R^{207}$ and $R^{208}$ may be the same or different and each represent a hydrogen atom or $C_{1-2}$ alkyl group; and $X^\ominus$ represents a counter ion.

14. The resin composition as in claim 1, wherein said organic ammonium salt is represented by formula (XII):

(XII)

wherein $R^{209}$, $R^{210}$ and $R^{211}$ each represent a saturated aliphatic alkyl group having 8 or more carbon atoms, with the proviso that at least one of $R^{209}$, $R^{210}$ and $R^{211}$ represents a branched aliphatic alkyl group containing at least one alkyl group having one or more carbon atoms in its side chain; $R^{212}$ represents a hydrogen atom or $C_{1-2}$ alkyl group; and $X^\ominus$ represents a counter ion.

15. The resin composition as in claim 1, wherein said layer silicate has a cation exchange capacity of not less than 50 meq/100 g.

16. The resin composition as in claim 1, wherein said organically-modified layer silicate compound has an interplanar spacing of from 2.3 nm to 5.0 nm.

17. The resin composition as in claim 1, wherein said organically-modified layer silicate compound has a particle diameter of from 50 nm to 8 μm.

18. The resin composition as in claim 1, wherein said synthetic resin is a thermoplastic resin.

19. An organically-modified layer silicate, comprising a quaternary ammonium ion represented by formula (X)' intercalated therein:

(X)' wherein $R^{201}$ represents a branched saturated aliphatic alkyl group having 8 or more carbon atoms containing at least one alkyl group having one or more carbon atoms in its side chain; and $R^{202}$, $R^{203}$ and $R^{204}$ may be the same or different and each represent a hydrogen atom or $C_{1-2}$ alkyl group.

20. An organically-modified layer silicate, comprising a quaternary ammonium ion represented by formula (XI)' intercalated therein:

(XI)' wherein $R^{205}$ and $R^{206}$ each represent a saturated aliphatic alkyl group having 8 or more carbon atoms, with the proviso that at least one of $R^{205}$ and $R^{206}$ represents a branched aliphatic alkyl group containing at least one alkyl group having one or more carbon atoms in its side chain; and $R^{207}$ and $R^{208}$ may be the same or different and each represent a hydrogen atom or $C_{1-2}$ alkyl group.

21. An organically-modified layer silicate, comprising a quaternary ammonium ion represented by formula (XII)' intercalated therein:

(XII)' wherein $R^{209}$, $R^{210}$ and $R^{211}$ each represent a saturated aliphatic alkyl group having 8 or more carbon atoms, with the proviso that at least one of $R^{209}$, $R^{210}$ and $R^{211}$ represents a branched aliphatic alkyl group containing at least one alkyl group having one or more carbon atoms in its side chain; and $R^{212}$ each represents a hydrogen atom or $C_{1-2}$ alkyl group.

* * * * *